United States Patent
Wang et al.

(10) Patent No.: US 12,521,708 B2
(45) Date of Patent: Jan. 13, 2026

(54) DOPED ANION EXCHANGE MEMBRANES (AEMs) FOR HIGHLY SELECTIVE SEPARATORS IN ELECTROCHEMICAL DEVICES

(71) Applicant: WASHINGTON UNIVERSITY, St. Louis, MO (US)

(72) Inventors: Zhongyang Wang, St. Louis, MO (US); Shrihari Sankarasubramanian, St. Louis, MO (US); Vijay K. Ramani, St. Louis, MO (US); Yunzhu Zhang, St. Louis, MO (US); Javier Parrondo, St. Louis, MO (US)

(73) Assignee: Washington University, St. Louis, MO (US)

( * ) Notice: Subject to any disclaimer, the term of this patent is extended or adjusted under 35 U.S.C. 154(b) by 937 days.

(21) Appl. No.: 17/264,016

(22) PCT Filed: Jul. 30, 2019

(86) PCT No.: PCT/US2019/044155
§ 371 (c)(1),
(2) Date: Jan. 28, 2021

(87) PCT Pub. No.: WO2020/028374
PCT Pub. Date: Feb. 6, 2020

(65) Prior Publication Data
US 2021/0299650 A1   Sep. 30, 2021

Related U.S. Application Data

(60) Provisional application No. 62/712,657, filed on Jul. 31, 2018.

(51) Int. Cl.
*B01J 41/14*  (2006.01)
*B01D 61/44*  (2006.01)
(Continued)

(52) U.S. Cl.
CPC .............. *B01J 41/14* (2013.01); *B01D 61/44* (2013.01); *B01D 69/12* (2013.01); *B01D 71/26* (2013.01);
(Continued)

(58) Field of Classification Search
CPC . B01J 41/14; B01J 41/07; B01J 47/018; B01J 47/12; B01D 61/44; B01D 69/12;
(Continued)

(56) References Cited

U.S. PATENT DOCUMENTS 5,547,551 A    8/1996  Bahar et al.
8,641,949 B2   2/2014  Yan et al.
(Continued)

FOREIGN PATENT DOCUMENTS

WO    2012081026 A2   6/2012

OTHER PUBLICATIONS

Vinodh, R. and Sangeetha, D. (2013), Comparative study of composite membranes from nano-metal-oxide-incorporated polymer electrolytes for direct methanol alkaline membrane fuel cells. J. Appl. Polym. Sci., 128: 1930-1938. https://doi.org/10.1002/app.38266 (Year: 2013).*

(Continued)

*Primary Examiner* — Christina H.W. Rosebach
(74) *Attorney, Agent, or Firm* — Armstrong Teasdale LLP

(57) ABSTRACT

Anion exchange membranes (AEMs) for separators in electrochemical devices and methods for making same are disclosed herein. AEMs include chloromethylated SEBS triblock copolymer functionalized with TRIS cations and chloromethylated QPEK-C functionalized with TMA cations. Composite AEMs further include metal oxide fillers. Reinforced AEMs and reinforced composite AEMs further include a reinforcement material base.

15 Claims, 40 Drawing Sheets

(51) Int. Cl.
| | |
|---|---|
| *B01D 69/12* | (2006.01) |
| *B01D 71/26* | (2006.01) |
| *B01D 71/28* | (2006.01) |
| *B01D 71/80* | (2006.01) |
| *B01J 41/07* | (2017.01) |
| *B01J 47/018* | (2017.01) |
| *B01J 47/12* | (2017.01) |
| *C08J 5/22* | (2006.01) |
| *C08L 53/00* | (2006.01) |
| *C25B 13/08* | (2006.01) |
| *H01M 8/0221* | (2016.01) |
| *H01M 8/0226* | (2016.01) |
| *H01M 8/18* | (2006.01) |

(52) U.S. Cl.
CPC ............ *B01D 71/28* (2013.01); *B01D 71/80* (2013.01); *B01J 41/07* (2017.01); *B01J 47/018* (2017.01); *B01J 47/12* (2013.01); *C08J 5/2243* (2013.01); *C08L 53/005* (2013.01); *C25B 13/08* (2013.01); *H01M 8/0221* (2013.01); *H01M 8/0226* (2013.01); *H01M 8/188* (2013.01); *C08J 2353/00* (2013.01); *C08J 2427/18* (2013.01); *H01M 2300/0082* (2013.01); *H01M 2300/0091* (2013.01)

(58) Field of Classification Search
CPC ........ B01D 71/26; B01D 71/28; B01D 71/80; C08J 5/2243; C08J 2350/00; C08J 2427/18; C08L 53/005; C08L 53/025; C25B 13/08; H01M 8/02221; H01M 8/0226; H01M 8/188; H01M 8/0221
See application file for complete search history.

(56) References Cited

U.S. PATENT DOCUMENTS

| | | | | |
|---|---|---|---|---|
| 2010/0291470 | A1* | 11/2010 | Sadasue | H01M 8/1058 |
| | | | | 429/479 |
| 2012/0119410 | A1* | 5/2012 | Yan | B01D 67/0006 |
| | | | | 264/216 |
| 2013/0085190 | A1* | 4/2013 | Sochilin | B01J 49/57 |
| | | | | 521/32 |
| 2016/0107154 | A1 | 4/2016 | Masel et al. | |
| 2018/0051380 | A1 | 2/2018 | Yoon et al. | |
| 2019/0044158 | A1* | 2/2019 | Wang | H01M 4/368 |

OTHER PUBLICATIONS

Gao, X. et al. High performance anion exchange ionomer for anion exchange membrane fuel cells. RSC Adv., 2017, 7, 19153-19161 (Year: 2017).*

Substance Detail CAS Registry No. 717133-99-8. Scifinder copyright 2024. (Year: 2024).*

Ji et al., "Highly selective sulfonated poly(ether ether ketone)/titanium oxide composite membranes for vanadium redox flow batteries", Journal of Membrane Science, 2017, vol. 539, pp. 197-205.

Mohanty et al., "Stable Elastomeric Anion Exchange Membranes Based on Quaternary Ammonium-Tethered Polystyrene-b-poly(ethylene-cobutylene)-b-polystyrene Triblock Copolymers", Macromolecules, 2015, vol. 48, pp. 7085-7095.

Sun et al., "Novel nanostructured high-performance anion exchange ionomers for anion exchange membrane fuel cells", Journal of Power Sources, 2012, vol. 202, pp. 70-77.

Vinodh et al., "A novel anion exchange membrane from polystyrene (ethylene butylene) polystyrene: Synthesis and characterization", Materials Science and Engineering B, 2010, vol. 167, pp. 43-50.

Yin et al., "Nano oxides incorporated sulfonated poly(ether ether ketone) membranes with improved selectivity and stability for vanadium redox flow battery", J Solid State Electrochem, 2016, vol. 20, pp. 1271-1283.

Yun et al., "Composite anion exchange membranes based on quaternized cardo-poly(etherketone) and quaternized inorganic fillers for vanadium redox flow battery applications", International Journal of Hydrogen Energy, 2016, vol. 41, pp. 10766-10775.

Zhang et al., "Sulfonated poly(ether ether ketone)/TiO2 double-deck membrane for vanadium redox flow battery application." Journal of Electroanalytical Chemistry, 2016, vol. 783, pp. 76-81.

International Search Report and Written Opinion for PCT/US2019/044155, mailed Oct. 17, 2019, 7 pages.

* cited by examiner

| Membrane | Silica weight fraction (%, w/w) |
|---|---|
| Pristine | 0 |
| TMSP, 30s | 0.0004 |
| TMSP, 1 min | 0.002 |
| TMSP, 5 min | 0.03 |
| TMSP, 10 min | 0.7 |

FIG. 15

DOPED ANION EXCHANGE MEMBRANES (AEMs) FOR HIGHLY SELECTIVE SEPARATORS IN ELECTROCHEMICAL DEVICES

CROSS-REFERENCE TO RELATED APPLICATIONS

This application is a US National Stage Entry of International Patent Application No. PCT/US2019/044155, filed Jul. 30, 2019, which claims the benefit of priority to U.S. Provisional Application No. 62/712,657, filed on Jul. 31, 2018, the entire contents of which are incorporated herein by reference in their entireties.

STATEMENT REGARDING FEDERALLY SPONSORED RESEARCH & DEVELOPMENT

This invention was made with government support under grant-number DE-AR0000768 awarded by the Advanced Research Projects Agency (ARPA-E) Department of Energy. The government has certain rights in the invention.

BACKGROUND OF THE DISCLOSURE

Ion exchange membranes (IEMs) possess the ability to selectively allow ions of one charge to pass through while opposing the cross-over of ions of the opposite charge. This selectivity is achieved by attaching charged species to the polymeric backbone wherein these moieties prevent the cross-over of similarly charged (same polarity) species in solution. Thus, ion exchange membranes may be classified as cation exchange membranes (CEMs) or anion exchange membranes (AEMs) depending on the ionic species being allowed to pass through. IEMs are not perfectly selective, i.e., CEMs allow a certain number of anions to cross-over and vice versa for AEMs.

Accordingly, there is a need for IEMs (and particularly AEMs) optimized for use as separators in electrochemical devices. The embodiments described herein resolve at least these known deficiencies.

BRIEF DESCRIPTION OF THE DISCLOSURE

In one aspect, the present disclosure is directed to an anion exchange membrane (AEM) comprising: a chloromethylated polystyrene-block-poly(ethylene-ran-butylene)-block-polystyrene (SEBS) triblock copolymer; and one or more functionalizing Tris(2,4,6-trimethoxyphenyl) phosphine (TRIS) cations.

In another aspect, the present disclosure is directed to a method for preparing an anion exchange membrane (AEM), the method comprising: chloromethylating a polystyrene-block-poly(ethylene-ran-butylene)-block-polystyrene (SEBS) triblock copolymer; and functionalizing the chloromethylated SEBS triblock copolymer with at least one TRIS cation.

In yet another aspect, the present disclosure is directed to a composite anion exchange membrane (AEM) comprising: a chloromethylated polystyrene-block-poly(ethylene-ran-butylene)-block-polystyrene (SEBS) triblock copolymer; one or more functionalizing TRIS cations; and, one or more metal oxide fillers.

In yet another aspect, the present disclosure is directed to a method for preparing a composite anion exchange membrane (AEM), the method comprising: chloromethylating a polystyrene-block-poly(ethylene-ran-butylene)-block-polystyrene (SEBS) triblock copolymer; and functionalizing the chloromethylated SEBS triblock copolymer with at least one TRIS cation incorporating at least one metal oxide filler into the TRIS-functionalized chloromethylated SEBS triblock copolymer.

In yet another aspect, the present disclosure is directed to a composite anion exchange membrane (AEM) comprising: a chloromethylated cardo-polyetherketone (CM-QPEK-C); one or more functionalizing trimethylamine (TMA) cations; and one or more metal oxide fillers.

In yet another aspect, the present disclosure is directed to a method for preparing a composite anion exchange membrane (AEM), the method comprising: chloromethylating a cardo-polyetherketone (QPEK-C); functionalizing the chloromethylated QPEK-C with at least one TMA cation; and incorporating at least one metal oxide filler into the TMA-functionalized chloromethylated QPEK-C.

In yet another aspect, the present disclosure is directed to a reinforced anion exchange membrane (AEM) comprising: a chloromethylated polystyrene-block-poly(ethylene-ran-butylene)-block-polystyrene (SEBS) triblock copolymer; one or more functionalizing TRIS cations; and a reinforcement material base.

In yet another aspect, the present disclosure is directed to a method for preparing a reinforced anion exchange membrane (AEM), the method comprising: chloromethylating a polystyrene-block-poly(ethylene-ran-butylene)-block-polystyrene (SEBS) triblock copolymer; functionalizing the chloromethylated SEBS triblock copolymer with at least one TRIS cation; and reinforcing the TRIS-functionalized, chloromethylated SEBS triblock copolymer with a reinforcement material base.

In yet another aspect, the present disclosure is directed to a reinforced composite anion exchange membrane (AEM) comprising: a chloromethylated cardo-polyetherketone (QPEK-C); one or more functionalizing TMA cations; one or more metal oxide fillers; and a reinforcement material base.

In yet another aspect, the present disclosure is directed to a method for preparing a reinforced composite anion exchange membrane (AEM), the method comprising: chloromethylating a cardo-polyetherketone (QPEK-C); functionalizing the chloromethylated QPEK-C with at least one TMA cation; incorporating at least one metal oxide filler into the TMA-functionalized chloromethylated QPEK-C and reinforcing the filler-incorporated, TMA-functionalized, chloromethylated QPEK-C with a reinforcement material base.

In yet another aspect, the present disclosure is directed to a reinforced composite anion exchange membrane (AEM) comprising: a chloromethylated polystyrene-block-poly(ethylene-ran-butylene)-block-polystyrene (SEBS) triblock copolymer; one or more functionalizing TRIS cations; one or more metal oxide fillers; and a reinforcement material base.

In yet another aspect, the present disclosure is directed to a method for preparing a reinforced composite anion exchange membrane (AEM), the method comprising: chloromethylating a polystyrene-block-poly(ethylene-ran-butylene)-block-polystyrene (SEBS) triblock copolymer; functionalizing the chloromethylated SEBS triblock copolymer with at least one TRIS cation; incorporating at least one metal oxide filler into the TRIS-functionalized chloromethylated SEBS triblock copolymer; and reinforcing the filler-incorporated, TRIS-functionalized, chloromethylated SEBS triblock copolymer with a reinforcement material base.

BRIEF DESCRIPTION OF THE DRAWINGS

The embodiments described herein may be better understood by referring to the following description in conjunction with the accompanying drawings.

FIG. 15 is an exemplary embodiment of filler quantity corresponding to various immersion times in accordance with the present disclosure.

FIG. 16A is an exemplary embodiment of conductivity over the course of the stability test of an ex-situ composite QPEK-C-TMA+TiO$_2$. FIG. 16B is an exemplary embodiment of conductivity over the course of the stability test of an ex-situ composite QPEK-C-TMA+SiO$_2$. FIG. 16C is an exemplary embodiment of conductivity over the course of the stability test of an ex-situ composite QPEK-C-TMA+Al$_2$O$_3$.

FIG. 23A shows a representative ex-situ composite membrane. FIG. 23B shows a representative in-situ composite membrane. FIG. 23C shows a representative cross-section.

FIG. 32A shows test stand images. FIG. 32B shows permeation rates measured by ICP-OES.

DETAILED DESCRIPTION OF THE DISCLOSURE

Figure 1:
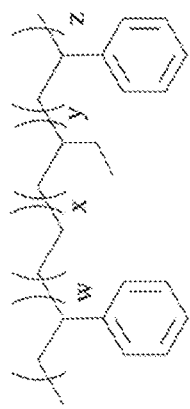
FIG. 1 is an exemplary embodiment of a scheme for the chloromethylation of SEBS and the synthesis of SEBS-based AEMs in accordance with the present disclosure.
Figure 1:
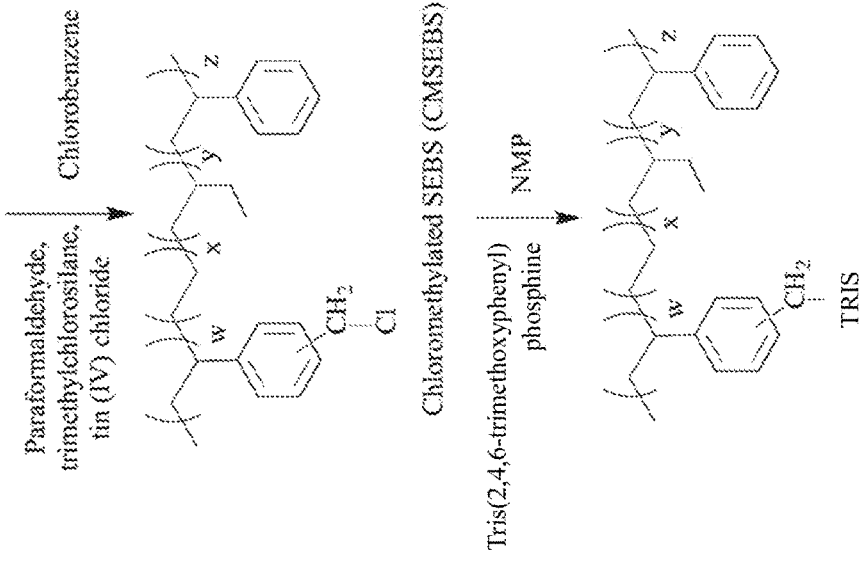
Figure 1:
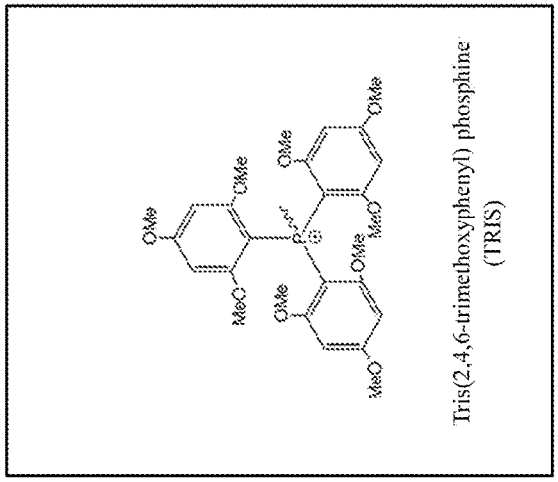

In some embodiments, this disclosure covers a triblock copolymer based anion exchange membrane, the processes to produce the functionalized triblock co-polymer along with supporting characterization data, and use of the functionalized membrane product as novel, tunable polymeric separators in electrochemical devices (fuel cells, electrolyzers, flow batteries, various water desalination systems (electrodialysis, capacitive deionization) and others). Triblock copolymer based AEMs are also described in U.S. Patent Application Ser. No. 62/541,482, entitled "Triblock Copolymer Based Anion Exchange Membranes (AEMs) and Uses Thereof," the entire contents of which are herein incorporated by reference in their entirety.

In other embodiments, this disclosure covers ionomer-metal oxide composite anion exchange membrane and methods for making the same. Composite membranes (AEMs) consisting of anion exchange ionomer doped with suitable, chemically inert oxide materials ($TiO_2$, $SiO_2$, $Al_2O_3$, $SnO_2$, $WO_2$, $SbO_2$, $NbO_2$, and other transition metal oxides) as inorganic filler are applicable as highly selective separators in electrochemical devices.

In yet other embodiments, this disclosure covers reinforced triblock co-polymer based anion exchange membranes, reinforced composite membrane (i.e. a membrane consisting of an ionomer and a suitable metal oxide filler) and scalable methods for making the same. These reinforced membranes are an enabling technology for electrochemical systems (redox flow batteries, water purifications systems). In some embodiments, the present disclosure is directed to a composite anion exchange membrane (AEM) comprising: a chloromethylated polystyrene-block-poly(ethylene-ran-butylene)-block-polystyrene (SEBS) triblock copolymer; one or more functionalizing TRIS cations; and, one or more metal oxide fillers.

In some embodiments described herein, membrane properties such as ionic conductivity, ion exchange capacity (IEC), permeability, permselectivity, transport number, young's modulus, ultimate tensile stress, elongation at break, swelling ratio and water uptake were measured. The high IEC and tensile strength means that the membranes (including the nanocomposite membranes) described herein are suitable for high throughput water desalination applications. The alkaline stability permits their application in alkaline water electrolyzers to produce hydrogen.

These classes of tunable membranes exceed the performance of state-of-the-art commercial membranes and finds wide application in the water desalination, hydrogen production and energy storage markets. The AEM market combines applications in water desalination, hydrogen production and energy storage. The membrane utilization applies to fuel cells, electrolyzers, and to various water desalination technologies such as membrane capacitive deionization and electrodialysis. Applications further include commercial scale-up for membrane and whole electrochemical stack manufacturing (such as for electrolyzer and fuel cell technologies, water desalination, water electrolysis, and redox flow batteries).

Triblock Co-Polymer-Based Anion Exchange Membranes Functionalized with a Large Cation In some embodiments, a highly permselective triblock copolymer functionalized with a large cation is disclosed. Modification (using novel cations) of a poly(styrene)-block-poly(ethylene-ran-butylene)-block-poly(styrene) (SEBS) triblock copolymer (available commercially) has achieved anion exchange membranes with high ionic conductivity and relative chemical stability for efficient use as separators in multiple electrochemical devices. The process to prepare and functionalize the SEBS based AEM with the Tris(2,4,6-trimethoxyphenyl) phosphine (TRIS) cation is described herein below.

Ion-containing block copolymers have provided clear evidence that the phase separation between hydrophilic and hydrophobic phases produces materials with excellent ionic conductivity. Styrene block-copolymers (such as polystyrene-block-poly(ethylene-ran-butylene)-block-polystyrene, SEBS) have attracted considerable attention given their high thermal and chemical stability and tunable mechanical properties. The mechanical properties (ultimate strength and elongation at break) of the separator are very important for applications where the membranes will be assembled in cells with relatively large active areas, wherein they are exposed to stresses that could result in deformation. For example, the mechanical properties of tri-block copolymers (e.g. polystyrene-block-poly(ethylene-ran-butylene)-block-polystyrene (SEBS)) are tuned by changing the proportion of styrene, which provides rigidity, to ethylene-butylene copolymers, which provides elasticity. Accordingly, in some embodiments describing a new process for the chloro-methylation of poly(styrene)-block-poly(ethylene-ran-butylene)-block-poly(styrene) triblock copolymer (available commercially), the amount of styrene acts as one of the parameters to "tune" polymer properties (physical strength, water uptake, degree of functionalization). Functionalization of the product (the chloromethylated SEBS triblock copolymer) is performed with several different novel cations. The cation selection is the second "tuning" parameter. The functional group may possess one or more positive charge centers. Some examples of functional groups with one charge center include Tris(2, 4,6-trimethoxyphenyl) phosphine (TRIS), triethylamine (TEA), quaternary 1-azaoniumbicyclo [2.2.2]octane (ABCO). Functional groups with multiple charge centers such as N1-(6-(dimethylamino) hexyl)-N1, N1, N4, N4, N4-methylhexane-1,6-dibromide, 3-(Dimethylamino)-2-hydroxy-N, N, N-trimethylpropan-1-aminium chloride may also be employed.

Experiments were performed in a flow battery by using the membranes and found they perform 4 times better than commercial membranes in terms of capacity retention. The battery was charged and discharged for at least 20 cycles (Approx. 100 hours of continuous operation). Use of the functionalized product (an anion exchange membrane) in various electrochemical systems resulted in improved lifetime of redox flow batteries, lower electricity consumption for various water desalination technologies and improved chemical stability allowing for applications in a variety of electrochemical systems in harsh acidic or alkaline environments.

Process 1: Production of Chloromethylated Polystyrene-Block-Poly(Ethylene-Ran-Butylene)-Block-Polystyrene (SEBS) Functionalized with the Tris(2,4,6-Trimethoxyphenyl) Phosphine (TRIS)

Figure 3:
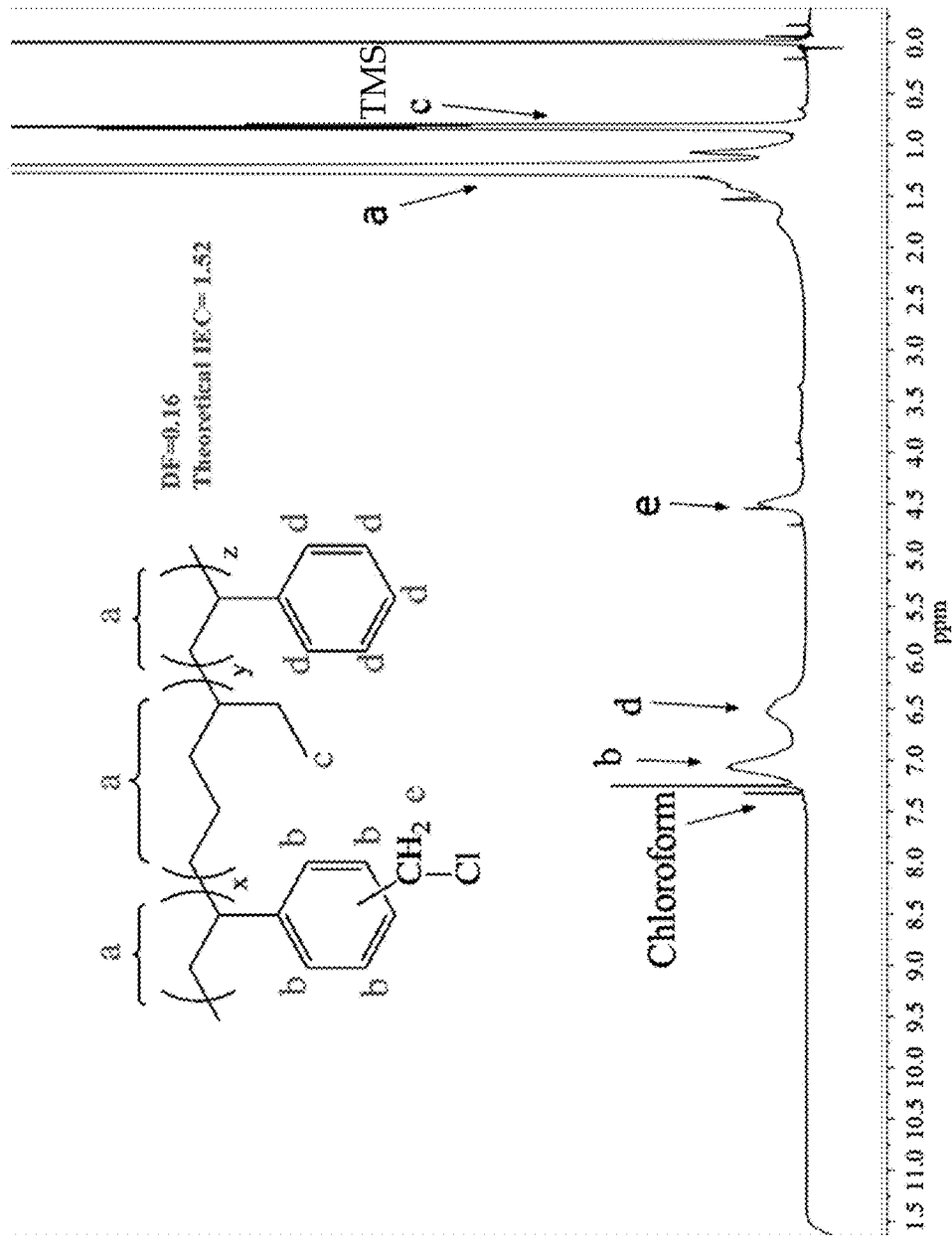
FIG. 3 is an exemplary embodiment of the $^1H$ NMR spectrum of CMSEBS30 in accordance with the present disclosure.
Figure 4:
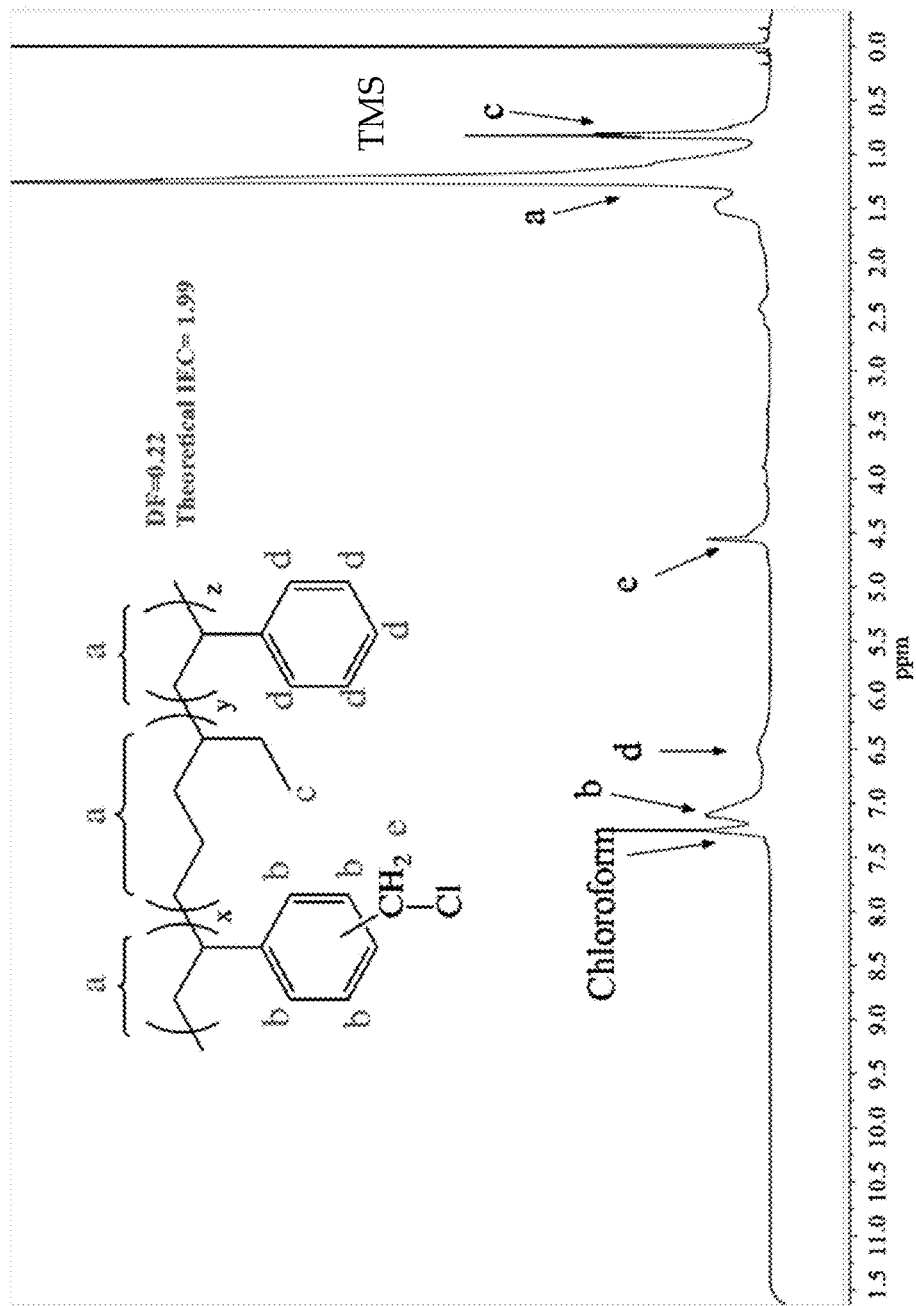
FIG. 4 is an exemplary embodiment of the $^1H$ NMR spectrum of CMSEBS35 in accordance with the present disclosure.
Figure 5:
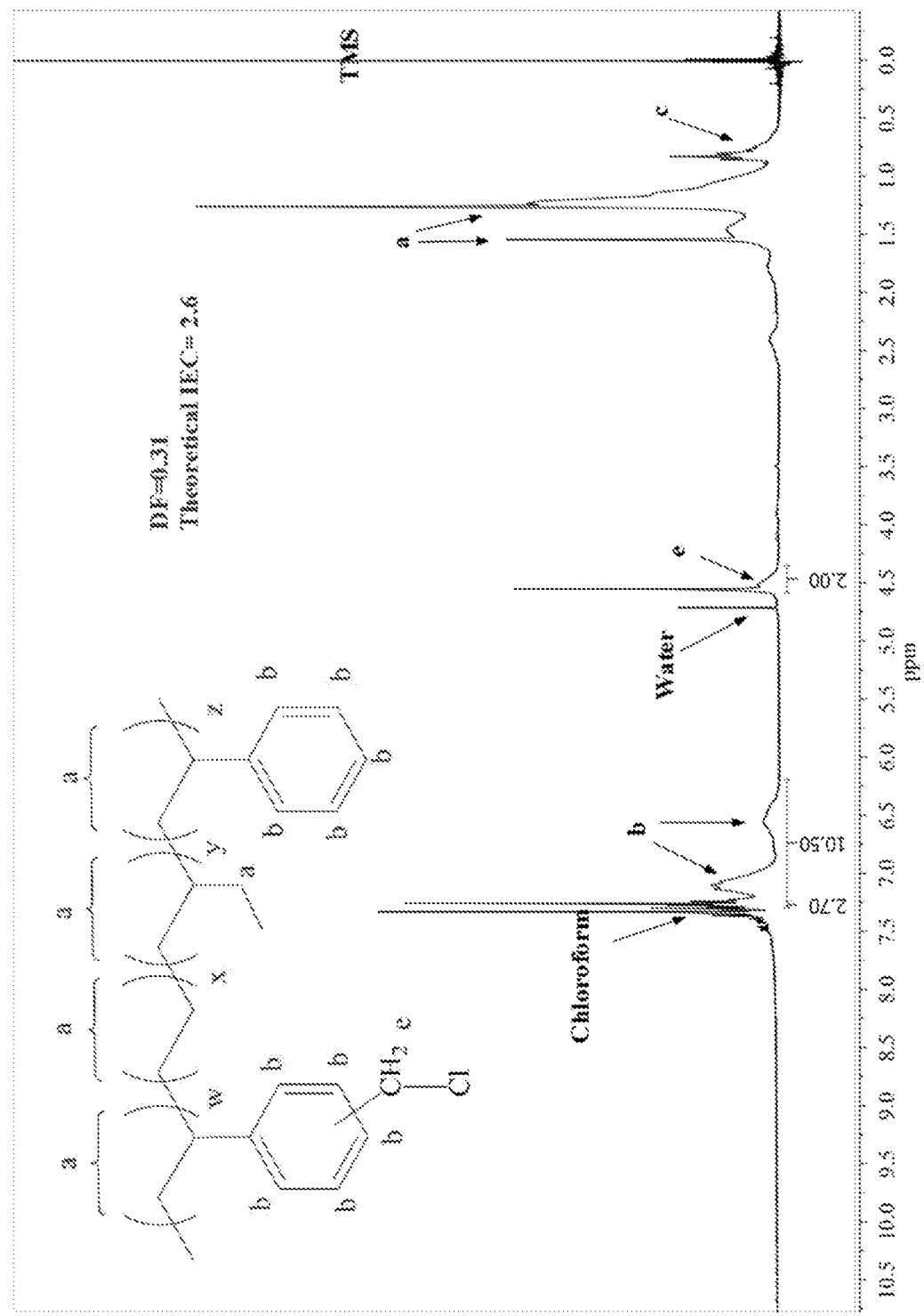
FIG. 5 is an exemplary embodiment of the $^1H$ NMR spectrum of CMSEBS55 in accordance with the present disclosure.

Synthesis of chloromethylated SEBS (CMSEBS). In some embodiments, SEBS 30 (30:70 molar ratio of styrene to rubber), SEBS 35, and SEBS 55 triblock copolymers are used as the polymer backbone for various AEMs. The chloromethylation process is summarized in FIG. 1. Following the chloromethylation reaction, H+ NMR was utilized to calculate the ion exchange capacity (IEC) of the membranes. The $^1$H NMR experiments were performed in chloroform-d with TMS, which was used as an internal standard for calibrating the chemical shift of $^1$H. From the NMR spectra in FIGS. 3-5, the degree of functionalization (DF) for CMSEBS30, CMSEBS35 and CMSEBS55 was calculated to be 0.16, 0.22, and 0.31 respectively. The theoretical DF values are 0.3, 0.35 and 0.55 respectively. As shown below, the DF value for CMSEBS30 was calculated by using equation [1], the DF value for CMSEBS35 was calculated by using equation [2], and the DF value for CMSEBS55 was calculated by using equation [3].

$$\frac{\frac{Area(e)}{2}}{Area(b) + \frac{Area(e)}{2}} \times 0.3 \quad [1]$$

$$\frac{\frac{Area(e)}{2}}{Area(b) + \frac{Area(e)}{2}} \times 0.35 \quad [2]$$

$$\frac{\frac{Area(e)}{2}}{Area(b) + \frac{Area(e)}{2}} \times 0.55 \quad [3]$$

Figure 2:
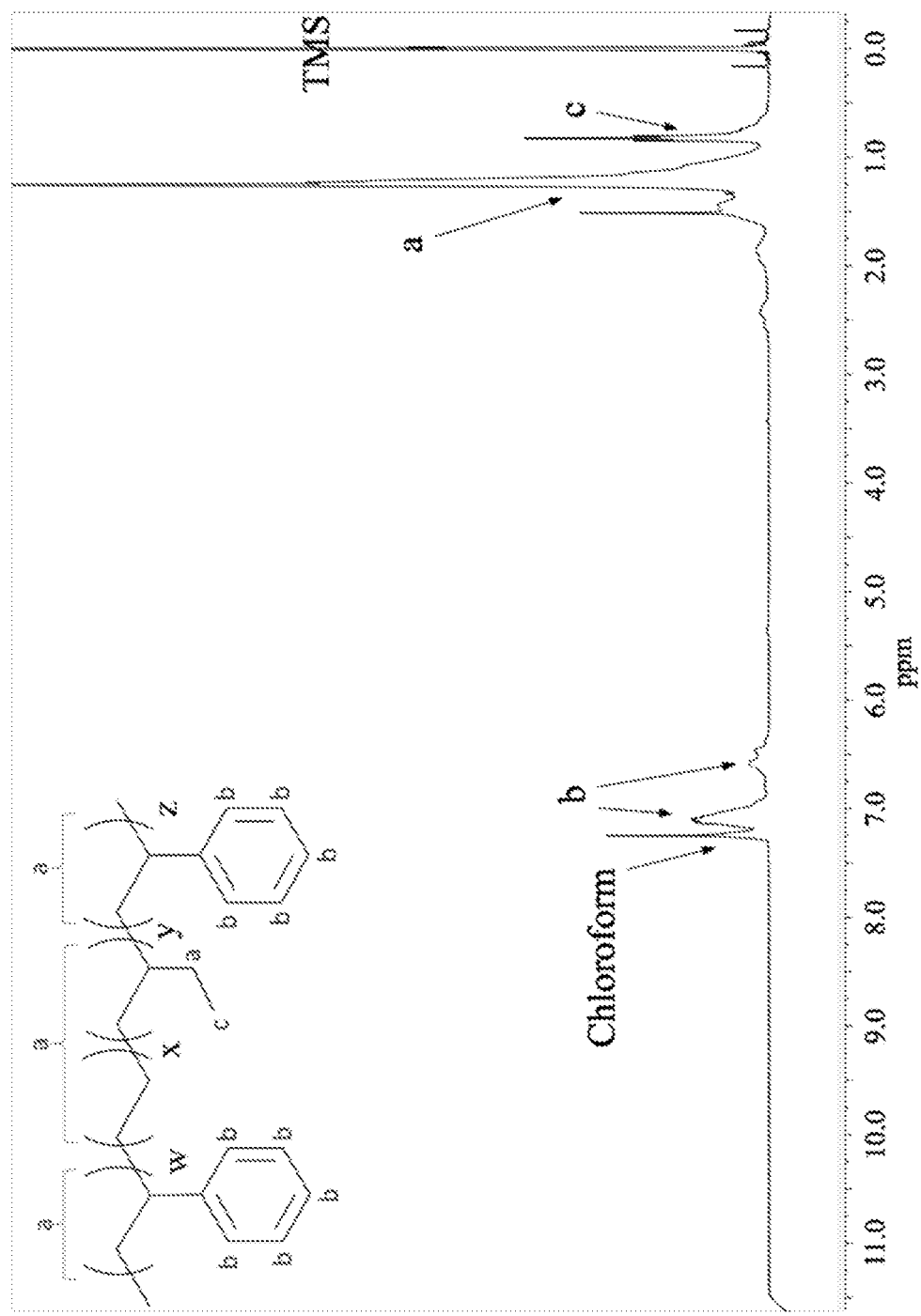
FIG. 2 is an exemplary embodiment of the $^1H$ NMR spectrum of SEBS in accordance with the present disclosure.

SEBS is a triblock co-polymer wherein the mole ratio of styrene to ethylene+butylene in the backbone can vary from about 0.1 to about 0.8 (see FIG. 2). In FIG. 2, peaks a and c correspond to the protons on the aliphatic backbone. Peaks b and d correspond to the protons on the aromatic ring. The new peak e (shown in FIGS. 3-5) demonstrated that the chloromethylation reaction occurred in the SEBS.

Synthesis of SEBS-TRIS. The addition of the Tris(2,4,6-trimethoxyphenyl) phosphine (TRIS) to the CMSEBS differs from a process for trimethylamine (TMA) due to the lower volatility of TRIS. The temperature stability allows for the application of stronger heating during the synthesis. The casting and CMSEBS membrane preparation procedures have been previously described. Briefly, the chloromethylation reaction can be carried out for different lengths of time, thereby controlling the proportion of styrene monomers that are functionalized. This can result in a degree of functionalization between 0-0.8 (i.e. ranging from none of the styrene monomers being functionalized to all the styrene monomers being functionalized) (see FIGS. 3-5). The chloromethylated SEBS (CM-SEBS) is cast on a glass (or any other material that exhibits a high contact angle (i.e. poor wettability) with the chlorinated organic solvents used to dissolve chloromethylated SEBS) plate and dried to produce a membrane film. The membrane film is reacted with the desired functional group in a solvent in which CM-SEBS is insoluble (e.g.: n-methyl pyrrolidone). As disclosed herein, in some embodiments, once the membrane was peeled off, it was immersed in a mixture of Tris(2,4,6-trimethoxyphenyl) phosphine (TRIS) (0.9 g) and 1-methyl-2-pyrrolidinone (NMP) (30 ml) in a round-bottom flask. The reaction was conducted at 80° C. for a day. The concentration of the functional group in the solvent is chosen so that it is >1×(i.e. in excess) the moles needed to completely functionalize all the chloromethylated styrene groups in SEBS (determined using the degree of functionalization from the NMR). The temperatures are chosen to be as highly as possible without degrading or volatilizing the dissolved functional groups.

Membrane Characterization

Ion exchange capacity. The IEC values listed in Table 1 were measured using the Volhard titration method. The IEC values are lower than the values reported for CMSEBS30-TMA (1.35 mmol Cl—/g of polymer) due to the higher molecular mass of the cation and also due to steric hindrance lowering the conversion rate of the chloromethyl units.

Ionic conductivity. The lower IEC led to lower conductivity. It is to be noted that for a 50 μm membrane, a conductivity of 1.45 mS/cm translates into an area specific resistance (ASR) of 3.44 Ω-cm$^2$. In some embodiments, if this membrane were to be reinforced and made 10 μm thick, the ASR would drop below 0.7 Ω-cm$^2$.

Water uptake. The water uptake values listed in Table 1 are substantially lower than the values reported for CMSEBS30-TMA membranes. The direct correlation between the IEC and water uptake is as expected. This accounts for the improved mechanical properties observed in the subsequent tensile strength test.

Acid uptake. The acid uptake values are listed in Table 1 and follow the same trend compared to the water uptake values as seen in the TMA+ functionalized membranes.

Tensile tests. These were performed according to the following test conditions to best simulate the conditions in an operating redox flow battery (RFB)—

Test condition: Controlled force with a tension clamp
Sample size: 3 mm×0.5 mm (L×W)
Temperature: 40° C.
Relative humidity: 50%
The test protocol was:
Equilibrate to test temperature
Achieve humidity condition,
Hold for 20 min isothermal
Ramp up at 0.5 MPa/min to break
FTIR spectroscopy. The presence of functional groups was qualitatively confirmed by using FTIR spectroscopy.

Figure 6:
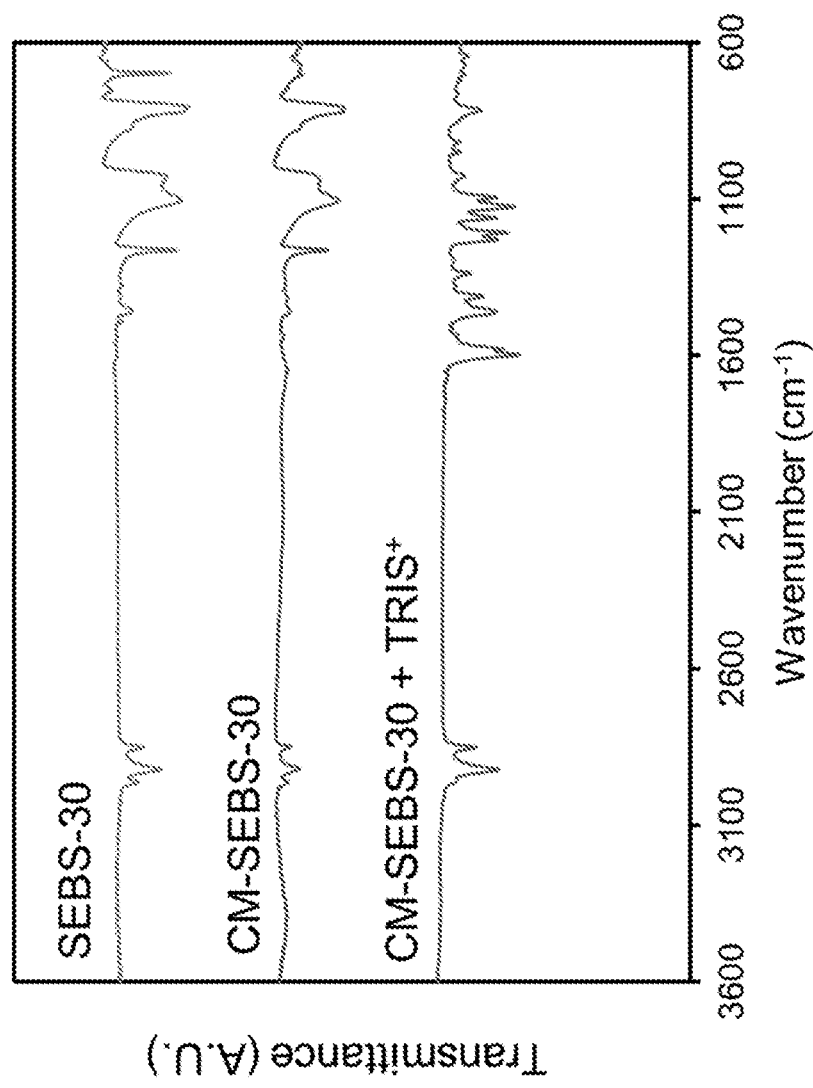
FIG. 6 is an exemplary embodiment of FTIR transmittance data for CMSEBS30 and SEBS30-TRIS in accordance with the present disclosure.

Appropriate background corrections were also performed. The FTIR data is shown in FIG. 6. Due to the absence of the NMR spectra to check the membrane for degradation (due to the insolubility of the functionalized SEBS in any common solvent), FTIR was used and allowed for the qualitatively determination of possible degradation modes.

TABLE 1

Properties of the CMSEBS30-TRIS AEM.

| | SEBS30-TRIS |
|---|---|
| Experimental IEC (mmol/g) | 0.65 ± 0.03 |
| Chloride conductivity (@ 40° C., mS/cm) | 1.45 ± 0.2 |
| Ultimate tensile stress (MPa) | 4 ± 0.4 |
| Elongation at break (%) | 480 ± 5 |
| Water uptake (%) | 9.8 |
| Swelling ratio (%) | 12 |
| Acid uptake (%) | 7.1 |

Ionomer-Metal Oxide Composite Anion Exchange Membranes

Embodiments describing ionomer-metal oxide composite AEMs are directed to improving the ion selectivity of commercially available (made to order by a commercial vendor) cardo-polyetherketone (QPEK-C) backbone based anion exchange membranes by using various percentages of suitable, chemically inert oxides. These oxides have been incorporated into the AEM by an ex-situ (physical mixing) process and also two in-situ (oxide precursor incorporated into the membrane and reacted in-situ to produce the oxide) processes at various percentages. This provides improved ion selectivity of the membrane while maintaining ionic conductivity. These membranes are envisioned being used in electrode-decoupled redox flow batteries (ED-RFBs), anion exchange membrane fuel cells, and membrane capacitive deionization systems. The low permeability of chromium ion and iron ion shows that the nanocomposite membranes are good candidates for ED-RFBs.

Figure 22:
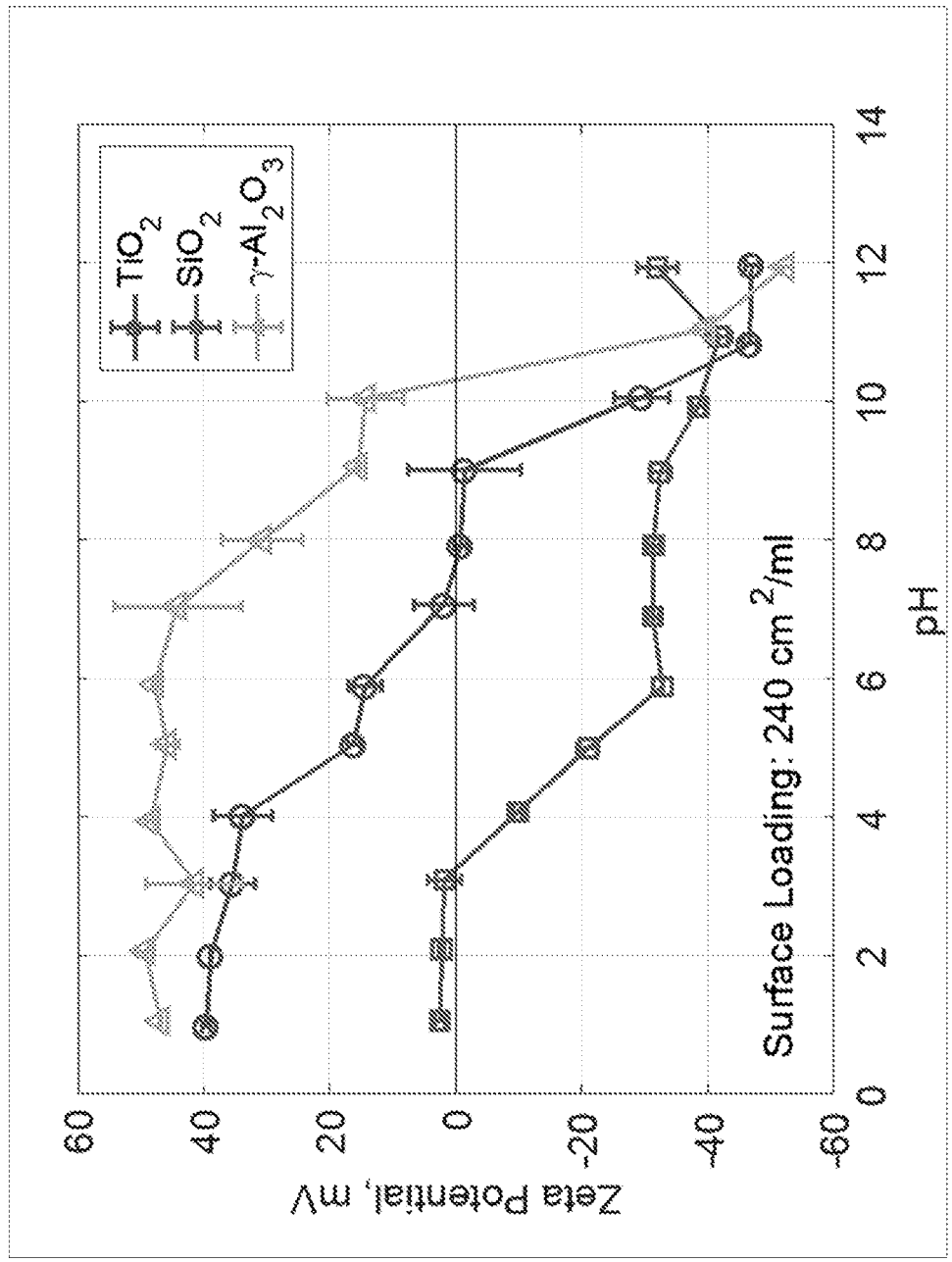
FIG. 22 is an exemplary embodiment of Zeta potential as a function of pH for SiO$_2$, TiO$_2$ and Al$_2$O$_3$ in accordance with the present disclosure.
Figure 23A:
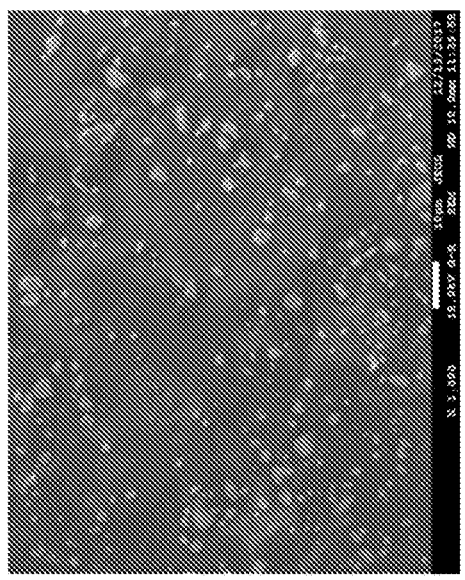
FIGS. 23A-C are exemplary embodiments of SEM images of surface morphology in accordance with the present disclosure.
Figure 23B:
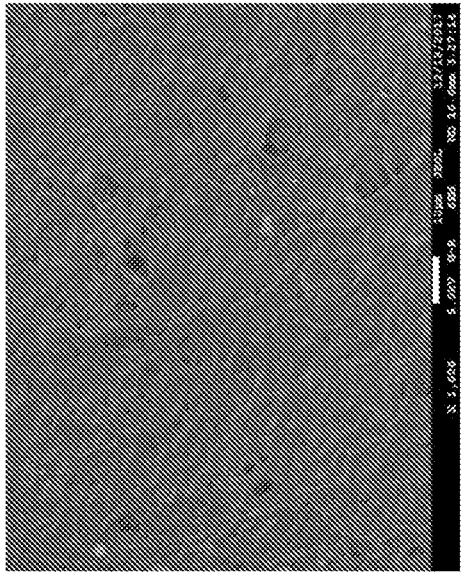
Figure 23C:
Figure 24B:
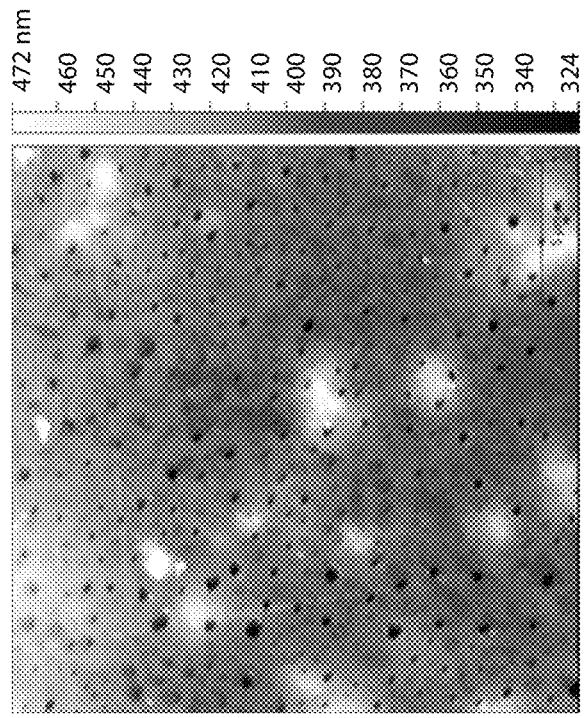
FIG. 24B is an exemplary embodiment of AFM topographic images of an ex-situ composite QPEK-C-TMA+TiO$_2$ in accordance with the present disclosure.
Figure 24A:
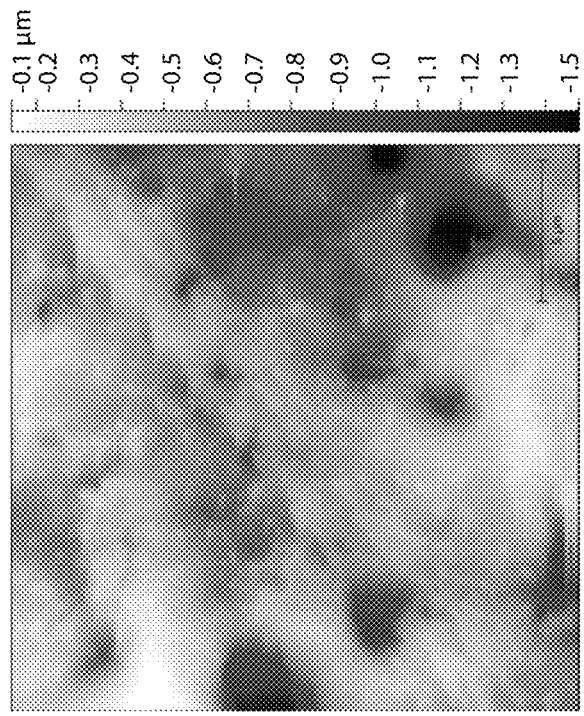
FIG. 24A is an exemplary embodiment of AFM topographic images of an in-situ composite QPEK-C-TMA+SiO$_2$ in accordance with the present disclosure.

A pathway to improve the selectivity of IEMs is to increase the number of charged groups attached to the polymeric backbone. The functional group may possess one or more positive charge centers. Some examples of functional groups with one charge center include Tris(2,4,6-trimethoxyphenyl) phosphine (TRIS), triethylamine (TEA), quaternary 1-azaoniumbicyclo [2.2.2]octane (ABCO), while functional groups with multiple charge centers such as N1-(6-(dimethylamino) hexyl)-N1, N1, N4, N4, N4-methylhexane-1,6-dibromide, 3-(Dimethylamino)-2-hydroxy-N, N, N-trimethylpropan-1-aminium chloride may also be employed. However, such an increase in the degree of functionalization is linked to a detrimental increase in water uptake. Embodiments describing ionomer-metal oxide composite AEMs achieve the goal of improved selectivity by incorporating metal oxide fillers that inhibit cation transport through the membrane. The metal oxides are chosen based on the surface charge on the metal oxide particles at the pH of device operation (see FIG. 22). Given that the membranes are anion conducting and cation repelling, metal oxides that exhibit a positive surface charge at the pH of device operation are preferred. The membrane described herein is specifically a cardo-poly(ether ketone) (QPEK-C) based AEM functionalized with the trimethylamine (TMA) cation, and the processes described herein are further applicable to create composite AEMs based on other suitable anion conducting ionomers. For instance, some embodiments of an ionomer-metal oxide composite AEM include a chloromethylated SEBS triblock copolymer functionalized with one or more TRIS cations (CMSEBS-TRIS). In some embodiments, incorporation of at least one metal oxide filler into a CMSEBS-TRIS membrane is achieved via an ex-situ, physical blending method to add metal oxide particles to the CMSEBS-TRIS anion-exchange ionomer solution and subsequently casting it to form a composite CMSEBS-TRIS AEM.

The quaternized cardo-poly(ether ketone) (QPEK-C) based AEM functionalized with the trimethylamine (TMA) cation, including the in-situ composite membranes and ex-situ composites, were prepared and functionalized as described herein. The synthesis of QPEK-C-TMA involved increasing the IEC of the ionomer and to ensure good control over the chloromethylation process so to obtain the desired IEC. The QPEK-C can be chloromethylated to achieve degrees of functionalization between 0 and 2, resulting in theoretical ion exchange capacities ranging from 0-3 meq $mol^{-1}$.

Figure 7:
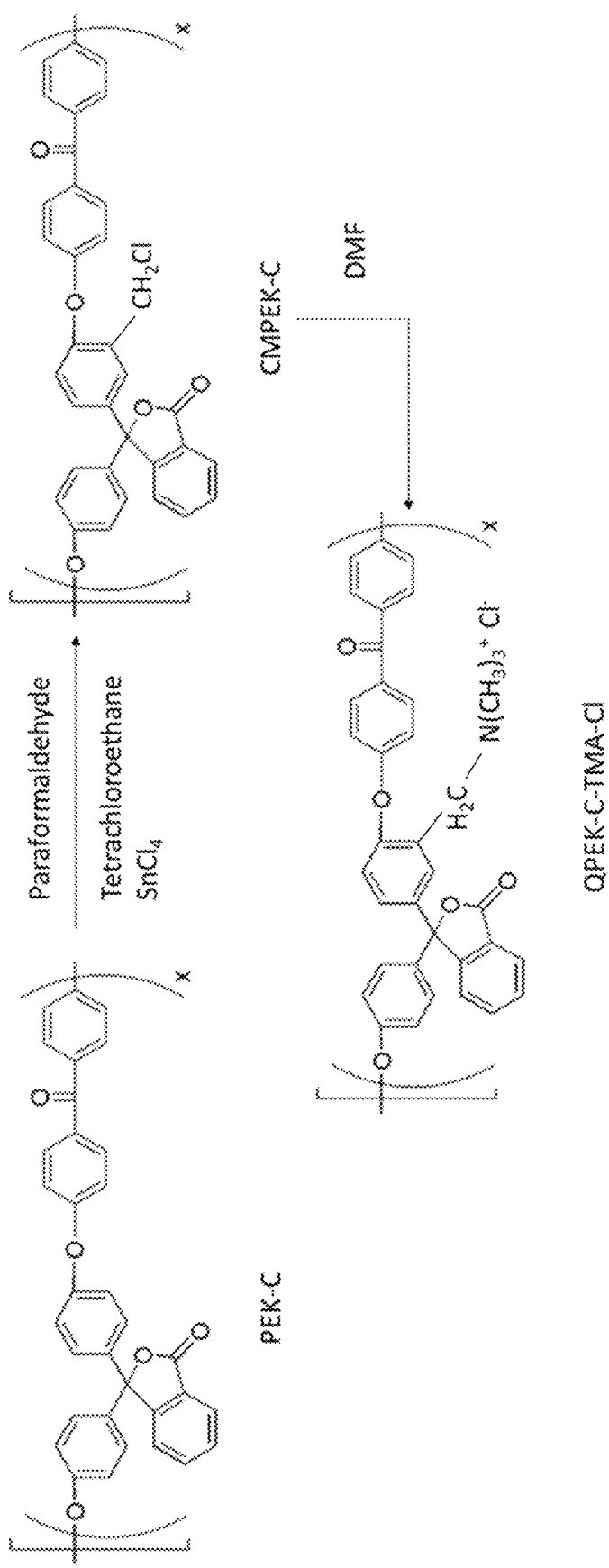
FIG. 7 is an exemplary embodiment of a scheme for the chloromethylation of CPEK and the synthesis of CPEK-based AEMs in accordance with the present disclosure.

Process 2: Production of Oxide (e.g., $TiO_2$, $SiO_2$, $Al_2O_3$) Composites with Quaternized Cardo-Poly(Ether Ketone) (QPEK-C) Based AEM Functionalized with the Trimethyleamine (TMA) Cation Synthesis of chloromethylated cardo-polyetherketone (CM-QPEK-C). 10 g of QPEK-C(Xuzhou Vat Chemical Company, China) was dissolved completely in 500 ml 1,1,2,2-tetrachloroethane (98.5%, Acros Organics). 6 g of paraformaldehyde (96%, Acros), 25 ml of chlorotrimethylsilane (98% Acros), and 0.47 ml of tin tetrachloride (>99%, Sigma Aldrich) were added to the solution, mixing well. The mixture was heated, and the reaction carried out at 80° C. for a week with reflux. The reaction solution was precipitated in methanol (3-4 times the volume of the reaction mixture). The white precipitate was filtered and purified by re-dissolving in dimethyformamide (DMF, 99.8%, Acros Organics) followed by re-precipitation in methanol. The purification process was carried out 2-3 times. The precipitate was dried at 40° C. overnight and stored for further use. The white solid CPEK was obtained with a degree of chloromethylation (chloromethyl groups per polymer repeating unit) of 0.8-0.9. The process is depicted in FIG. 7.

Figure 8:
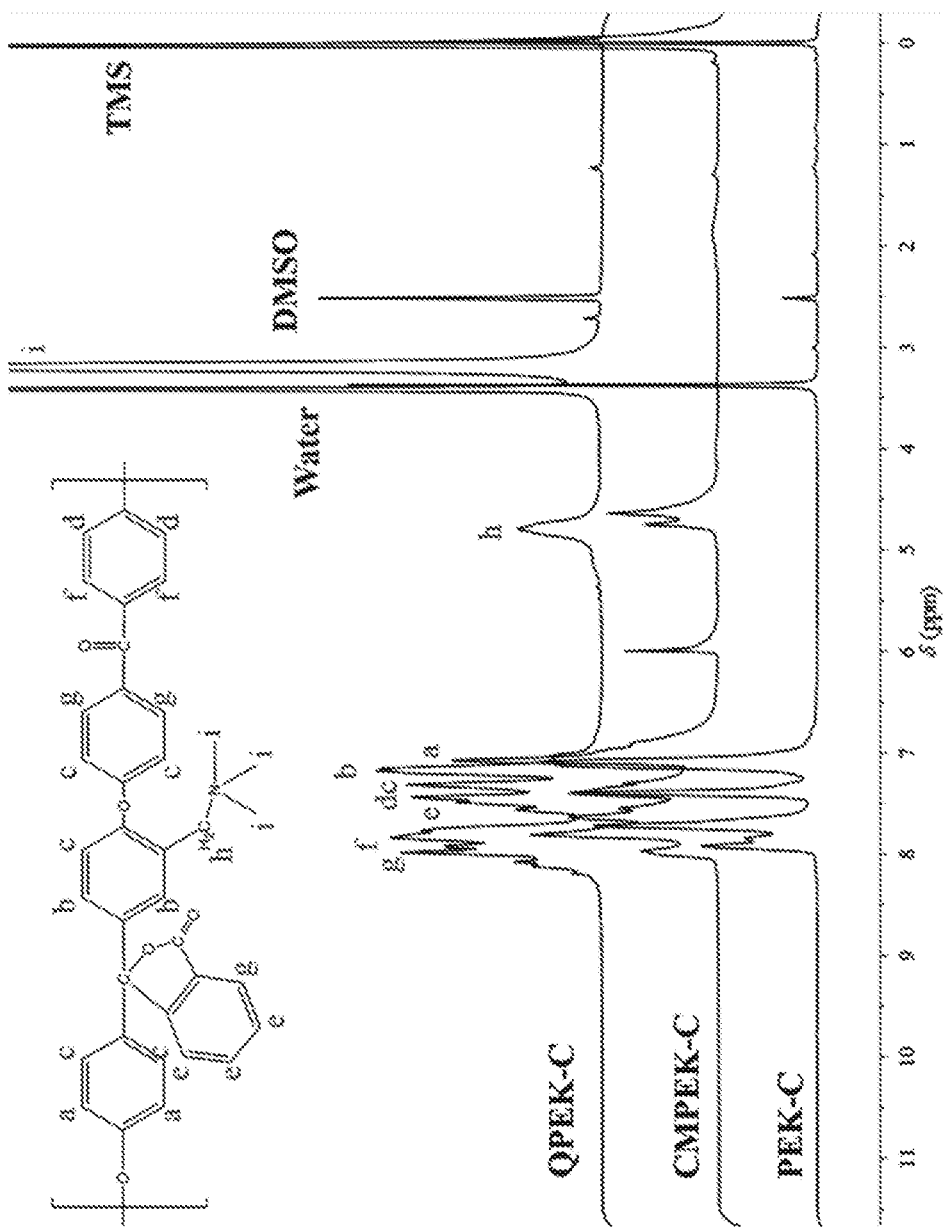
FIG. 8 is an exemplary embodiment of a representative $^1H$ NMR spectrum of PEK-C and further reaction products in accordance with the present disclosure. The DF of CMPEK-C was calculated from the ratio of the areas of peak h and aromatic protons (peaks a-g).

Addition of the quaternary ammonium cation to produce QPEK-C-TMA+Cl—. 0.5 g of QPEK-C was dissolved completely in 9 ml of DMF followed by the addition of 0.7 ml of trimethylamine (TMA) to the mixture. The solution was stirred and reacted at 30° C. for 2 days. The membrane was obtained by casting the reaction mixture onto a 3"×3" flat glass plate in an oven at 70° C., heated overnight on a leveled surface. The thickness of the obtained membranes was approximately 40 μm. The process is depicted in FIG. 7. And the H+ NMR to verify degree of functionalization is depicted in FIG. 8.

Synthesis of the Composite Membranes

Materials and chemicals. Titanium dioxide (<25 nm particle size, 99.7 trace metals basis, Sigma-Aldrich), dimethyl sulfoxide (ACS spectrophotometric grade, >99.9% Sigma-Aldrich), tetraethyl orthosilicate (99.999%, Sigma-Aldrich), N,N-dimethylformamide (99.8%, Sigma-Aldrich), hydrochloric acid (37%, Sigma-Aldrich), N-trimethoxysilylpropyl-N,N,N-trimethylammonium chloride (Sigma-Aldrich).

Figure 9A:
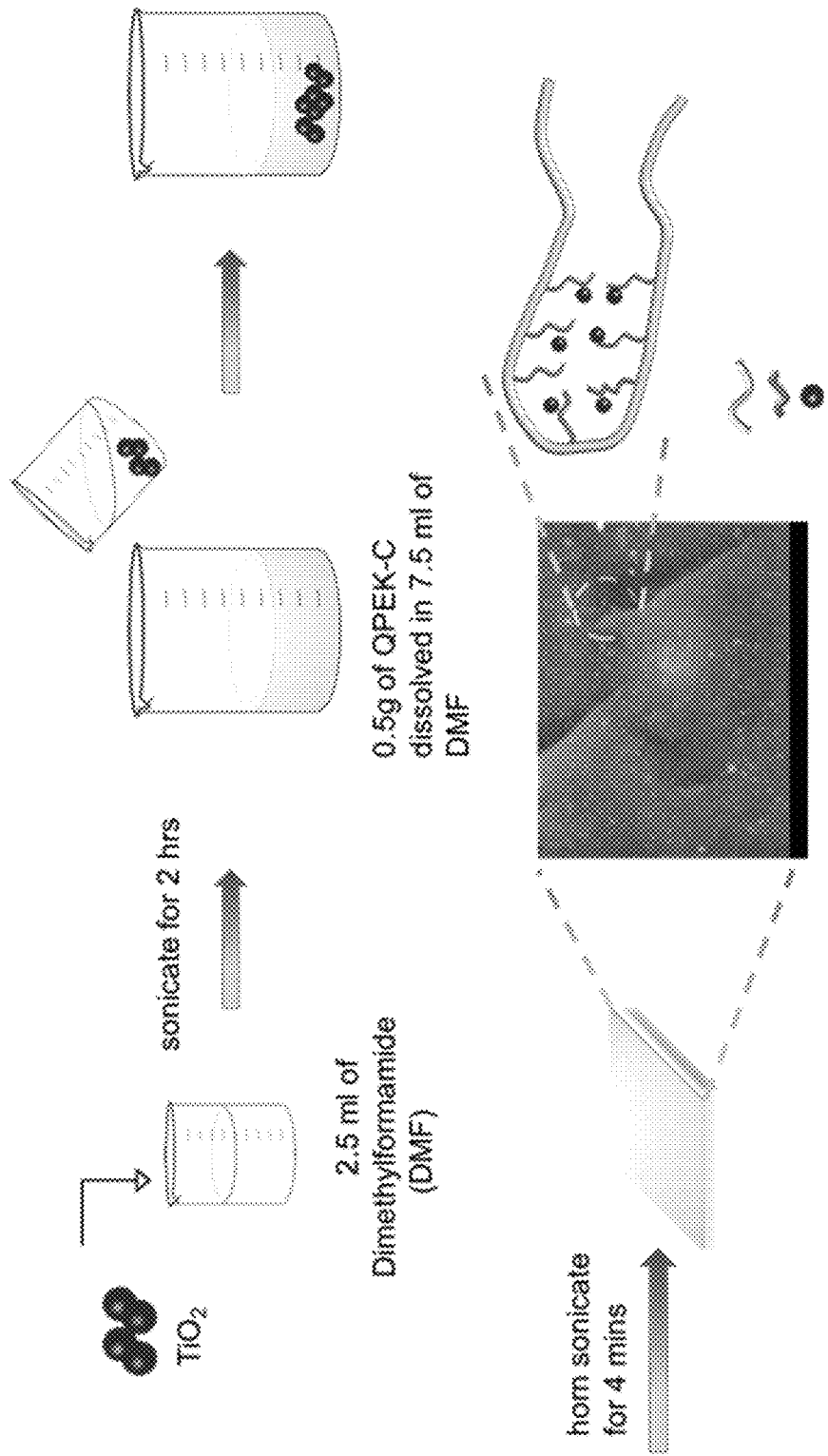
FIG. 9A is an exemplary embodiment of preparation of the composite membranes with respect to an ex-situ method in accordance with the present disclosure.

Ex-situ fabrication of ionomer-$TiO_2$ composites. 0.6 g of QPEK-C TMA+Cl— was dissolved in 9 ml dimethyl sulfoxide (DMSO). 5 wt % (0.03 g) and 7 wt % (0.042 g) titanium dioxide ($TiO_2$) were dispersed in 0.5 ml DMSO and sonicated for 1 hour. The solutions were subsequently mixed and stirred vigorously overnight. The resultant mixture was cast on a 3"×3" flat glass plate in an oven at 40° C. overnight on a leveled surface. The thickness of the membranes obtained was approximately 40 µm. 1 wt % and 3 wt % titanium dioxide (TiO$_2$) composites were similarly fabricated. This process is schematically represented in FIG. 9A.

Figure 9B:
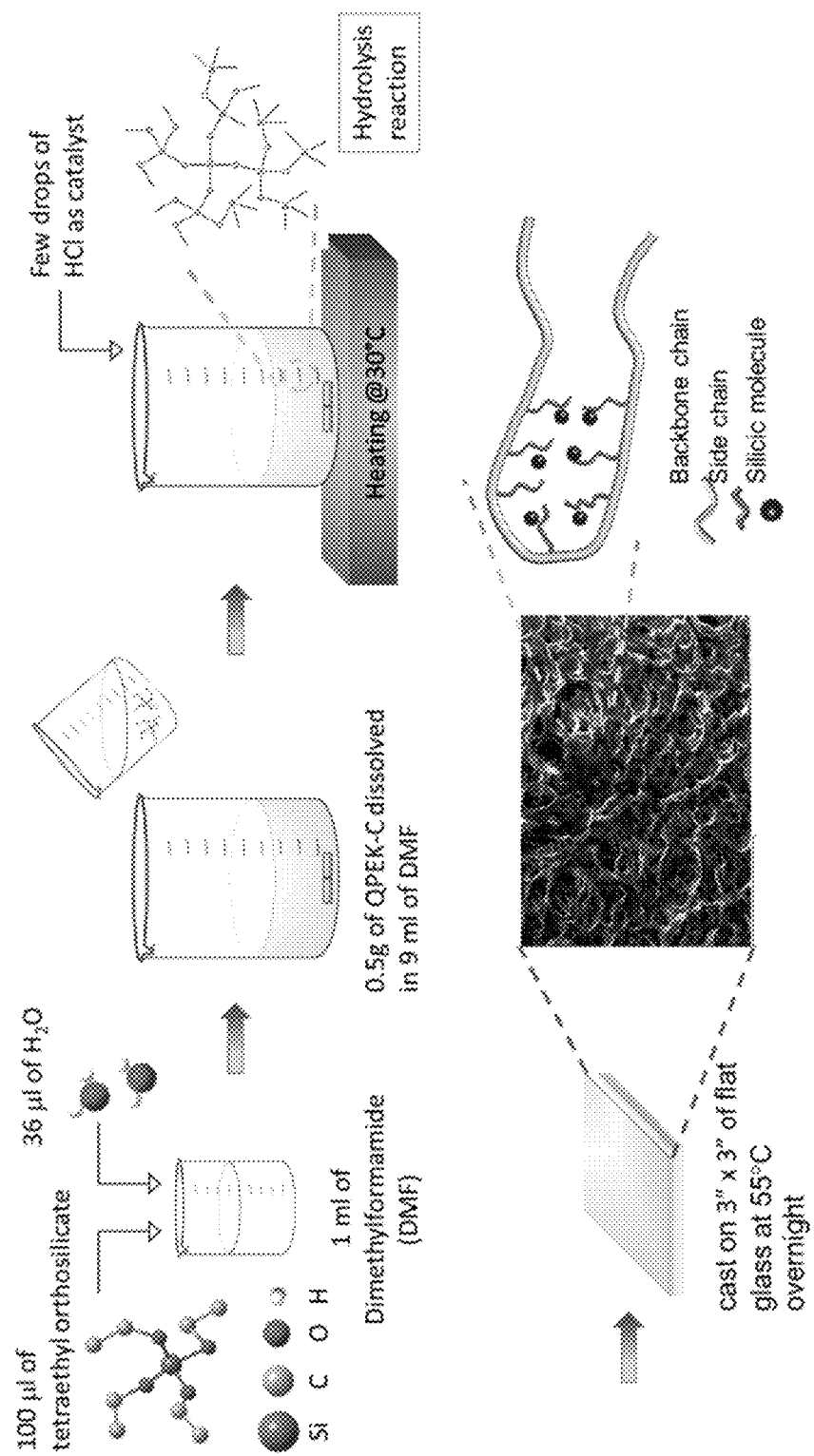
FIG. 9B is an exemplary embodiment of preparation of the composite membranes with respect to an in-situ solubilized precursor method in accordance with the present disclosure.

In-situ fabrication of ionomer-SiO$_2$ composites: Solubilized precursor method. 100 µl of tetraethyl orthosilicate (TEOS) was added to 1 ml of N, N-dimethylformamide (DMF). The mixture was slowly mixed with addition of 36 µl of deionized water. This TEOS mixture was slowly added to 0.5 g of QPEK-C TMA+Cl— in 9 ml of DMF. Few drops of hydrochloric acid were added into the mixture to catalyze the hydrolysis-condensation reaction and stirred well. The solution was heated at 30° C. and agitated to prevent aggregation of the SiO$_2$ produced and then cast on 3"×3" of flat glass at 55° C. overnight. The thickness of membranes obtained was approximately 60 µm. This process is schematically represented in FIG. 9B.

In-situ fabrication of ionomer-SiO$_2$ composites: Precursor imbibition method. The major difference between this method and the previous in-situ method is that while the metal oxide precursor and the ionomer are both dissolved in a common solvent in the previous case, here the membrane is pre-cast and the precursor is imbibed into the membrane using a carrier solvent in which the membrane is insoluble.

Figure 9C:
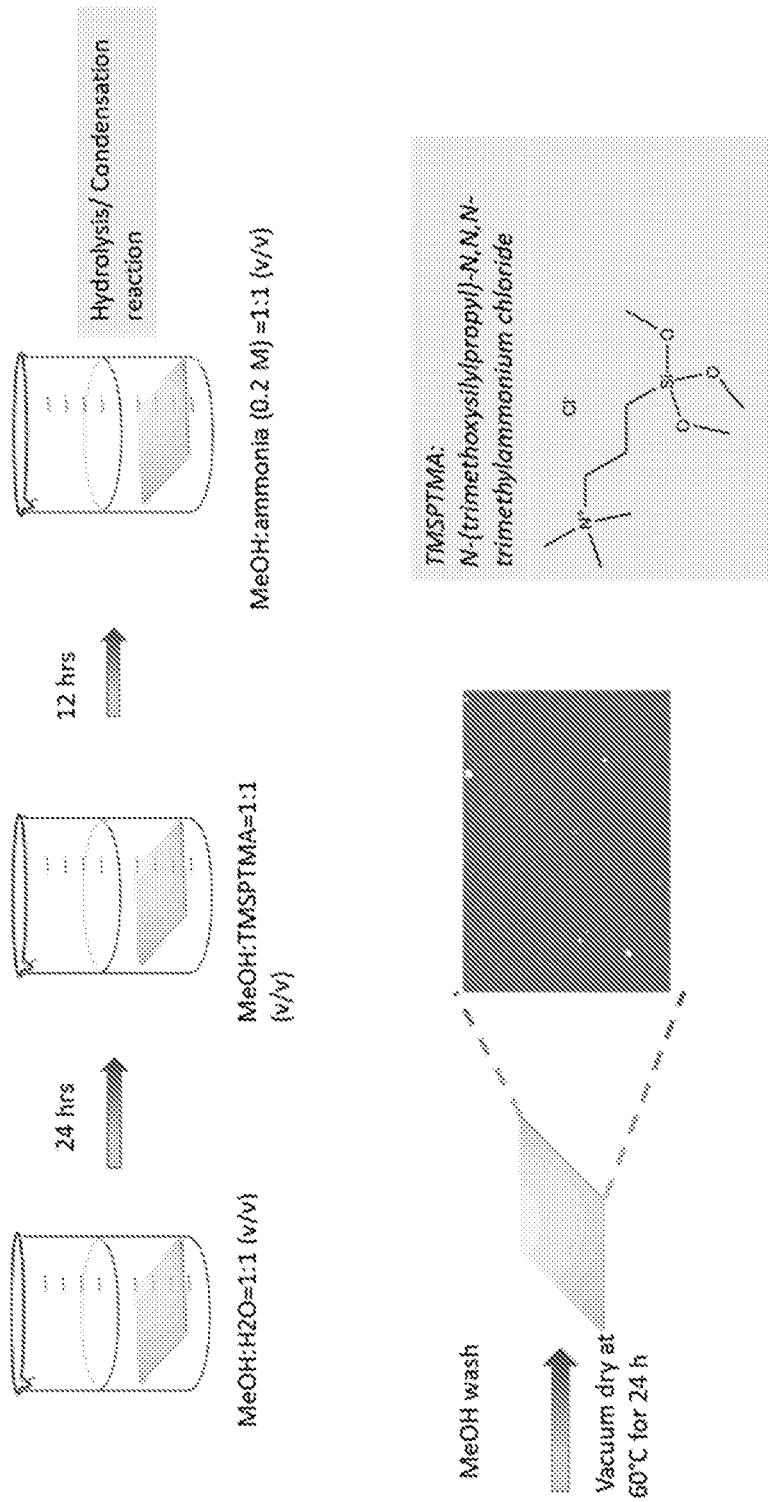
FIG. 9C is an exemplary embodiment of preparation of the composite membranes with respect to an in-situ precursor imbibition method in accordance with the present disclosure.

The CPEK-TMA membrane was prepared and cast as outlined above. The membrane was immersed in a methanol water mixture to swell it over 24 hours, transferred to a methanol bath containing the precursor N-(trimethoxysilylpropyl)-N,N,N-trimethylammonium chloride (TMSPTMA) and allowed to imbibe the precursor over 12 hours. The membrane was then transferred to a methanol-ammonia solution to undergo the hydrolysis-condensation reaction and incorporate the silica into the polymer side chains. This process is schematically represented in FIG. 9C.

Ex-situ fabrication of ionomer-Al$_2$O$_3$ composites. 0.6 g of QPEK-C TMA+Cl was dissolved in 9 ml dimethyl sulfoxide (DMSO). 5 wt % (0.03 g) and the desired wt % of Al$_2$O$_3$ were dispersed in 0.5 ml DMSO and sonicated for 1 hour. The solutions were subsequently mixed and stirred vigorously overnight. The resultant mixture was cast on a 3"×3" flat glass plate in an oven at 40° C. overnight on a leveled surface. The thickness of the membranes obtained was approximately 40 µm.

Membrane Characterization

Ion exchange capacity. The IEC values listed in Table 2 were measured using the Volhard titration method. The IEC varies with the content of the metal oxide indicating that the metal oxides are not forming simple mixtures but are bonded to the QPEK-C backbone.

Figure 10A:
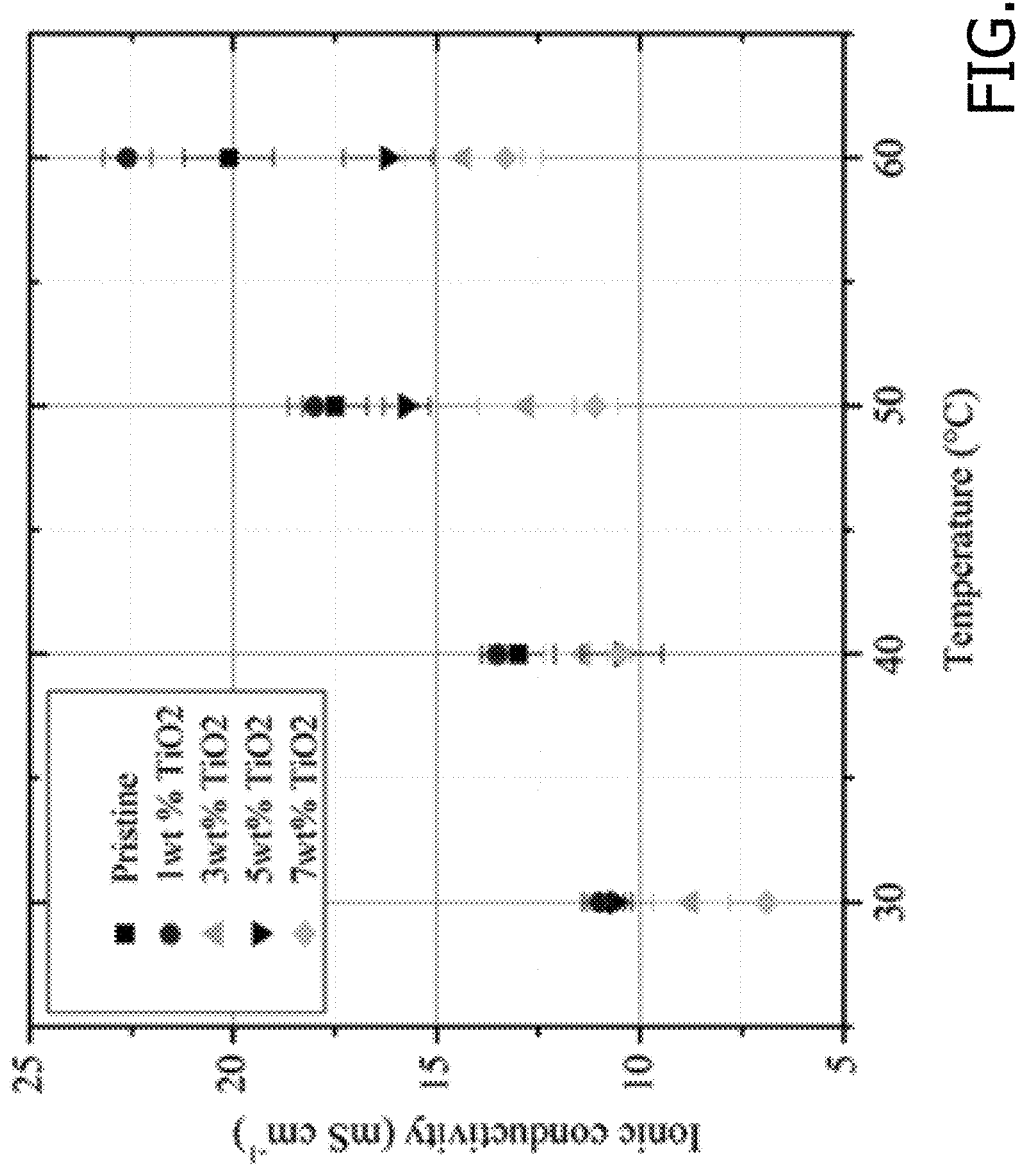
FIG. 10A is an exemplary embodiment of temperature dependence of the conductivity of ex-situ composite QPEK-C-TMA+TiO$_2$ in accordance with the present disclosure.
Figure 10B:
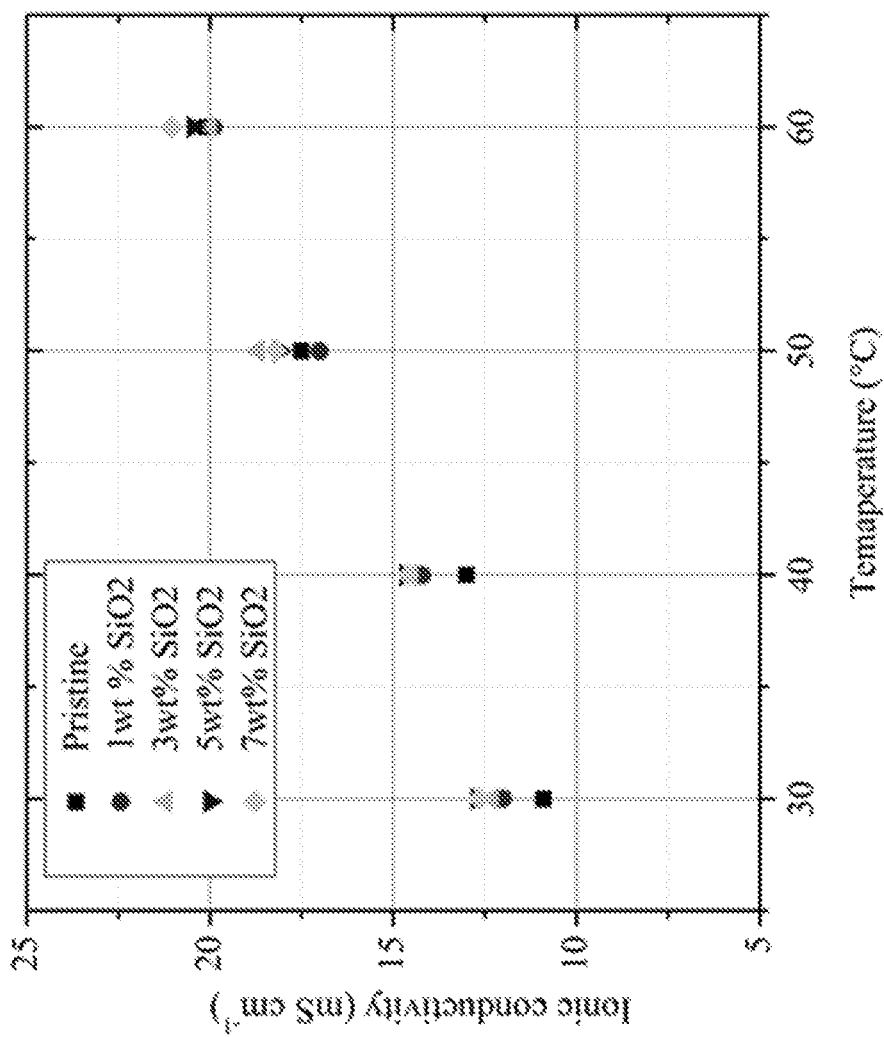
FIG. 10B is an exemplary embodiment of temperature dependence of the conductivity of ex-situ composite QPEK-C-TMA+SiO$_2$ accordance with the present disclosure.
Figure 11:
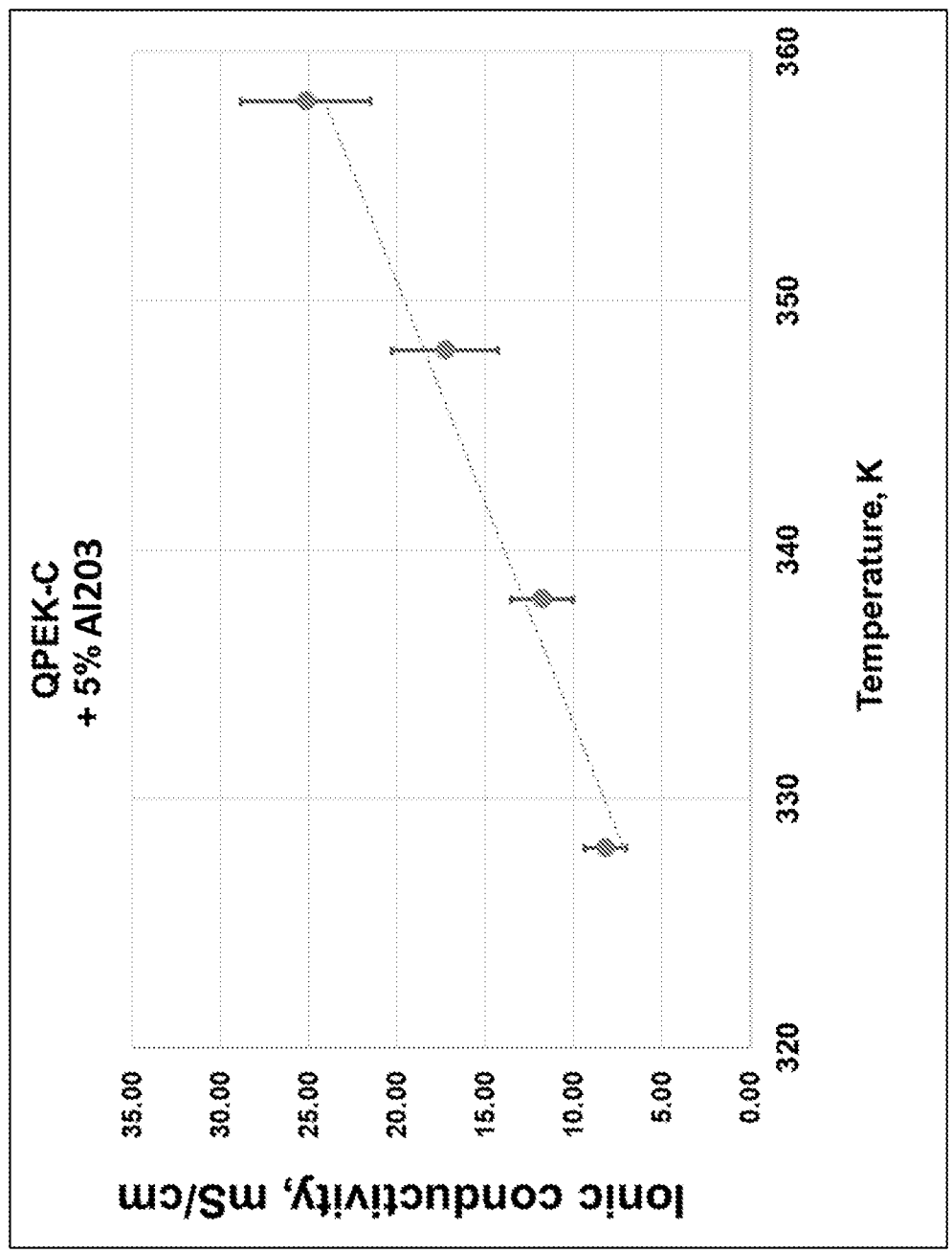
FIG. 11 is an exemplary embodiment of temperature dependence of the ionic conductivity of ex-situ composite QPEK-C-TMA+Al$_2$O$_3$ in accordance with the present disclosure.
Figure 12:
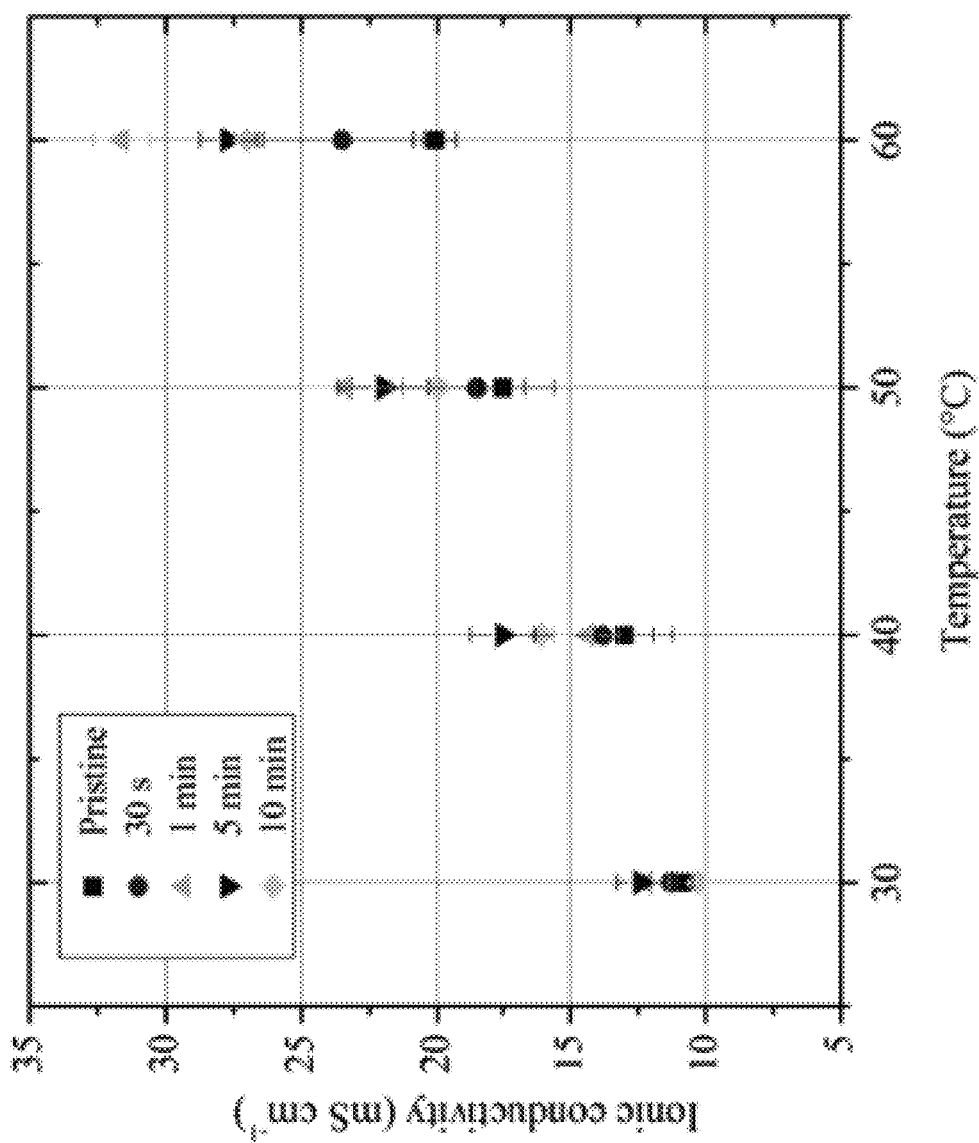
FIG. 12 is an exemplary embodiment of temperature dependence of the conductivity of in-situ composite QPEK-C-TMA+SiO$_2$ in accordance with the present disclosure.

Ionic conductivity. The addition of the metal oxides decreased conductivity as expected. The observation that the in-situ composite membranes had a lower reduction in conductivity as compared to the pristine membranes despite higher metal oxide content indicates substantial alteration of the structure of the membrane. Temperature dependences of the conductivity of ex-situ composite QPEK-C-TMA+TiO$_2$ as well as the ex-situ composite QPEK-C-TMA+SiO$_2$ are shown in FIGS. 10A and 10B, respectively. Temperature dependence of the ionic conductivity of ex-situ composite QPEK-C-TMA+Al$_2$O$_3$ is shown in FIG. 11. FIG. 12 shows temperature dependence of the conductivity of in-situ composite QPEK-C-TMA+SiO$_2$.

Figure 13A:
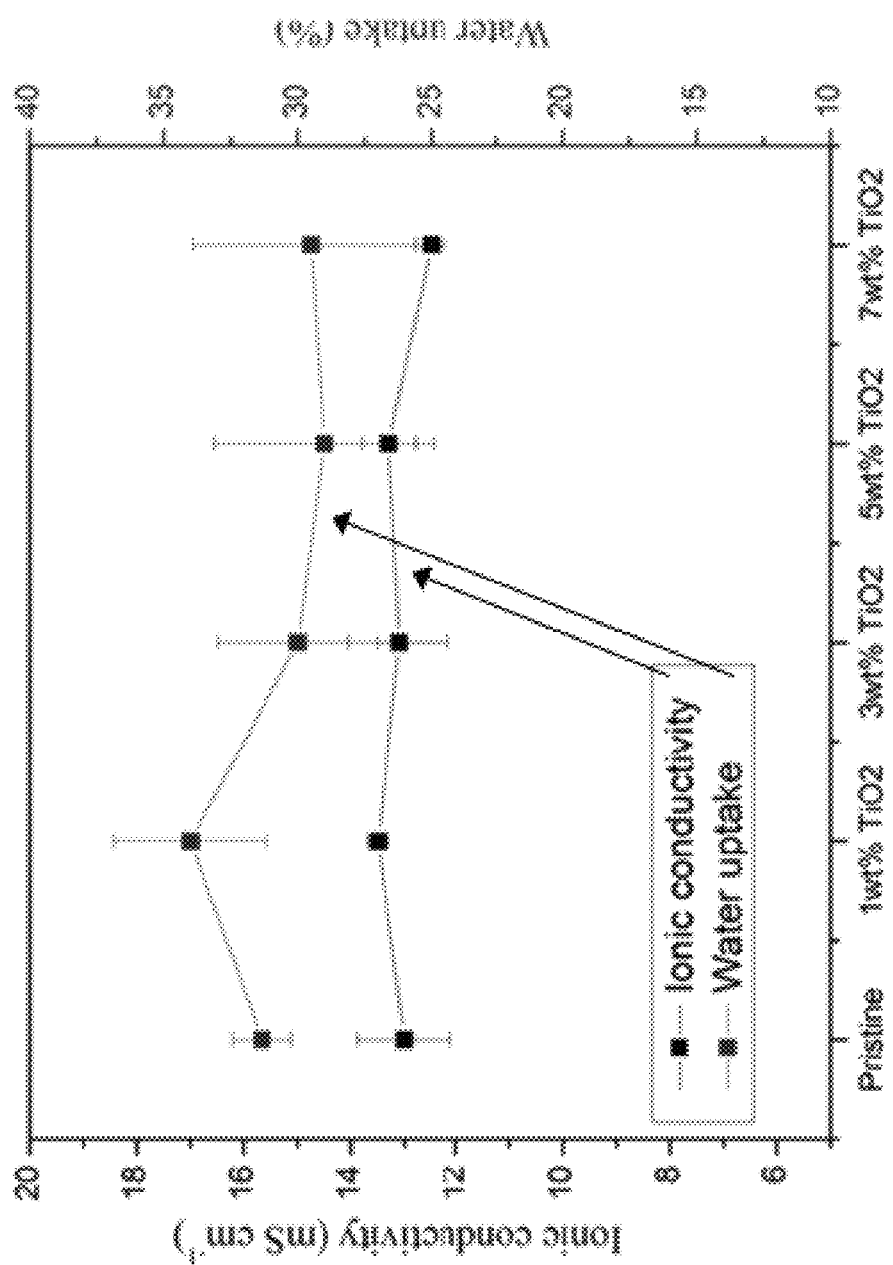
FIG. 13A is an exemplary embodiment of impact of filler quantity on conductivity and water uptake in ex-situ composite QPEK-C-TMA+TiO$_2$ in accordance with the present disclosure.
Figure 13B:
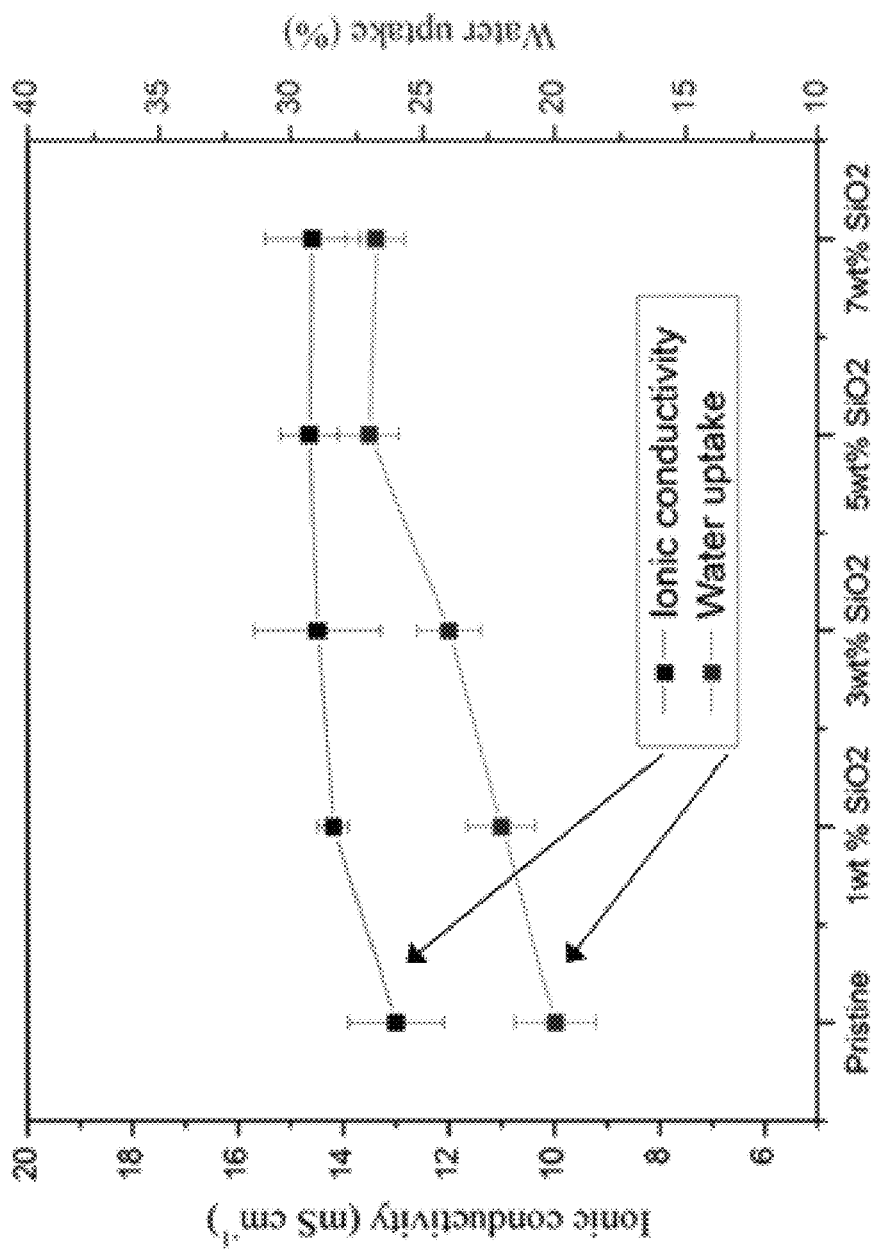
FIG. 13B is an exemplary embodiment of impact of filler quantity on conductivity and water uptake in ex-situ composite QPEK-C-TMA+SiO$_2$ in accordance with the present disclosure.
Figure 14:
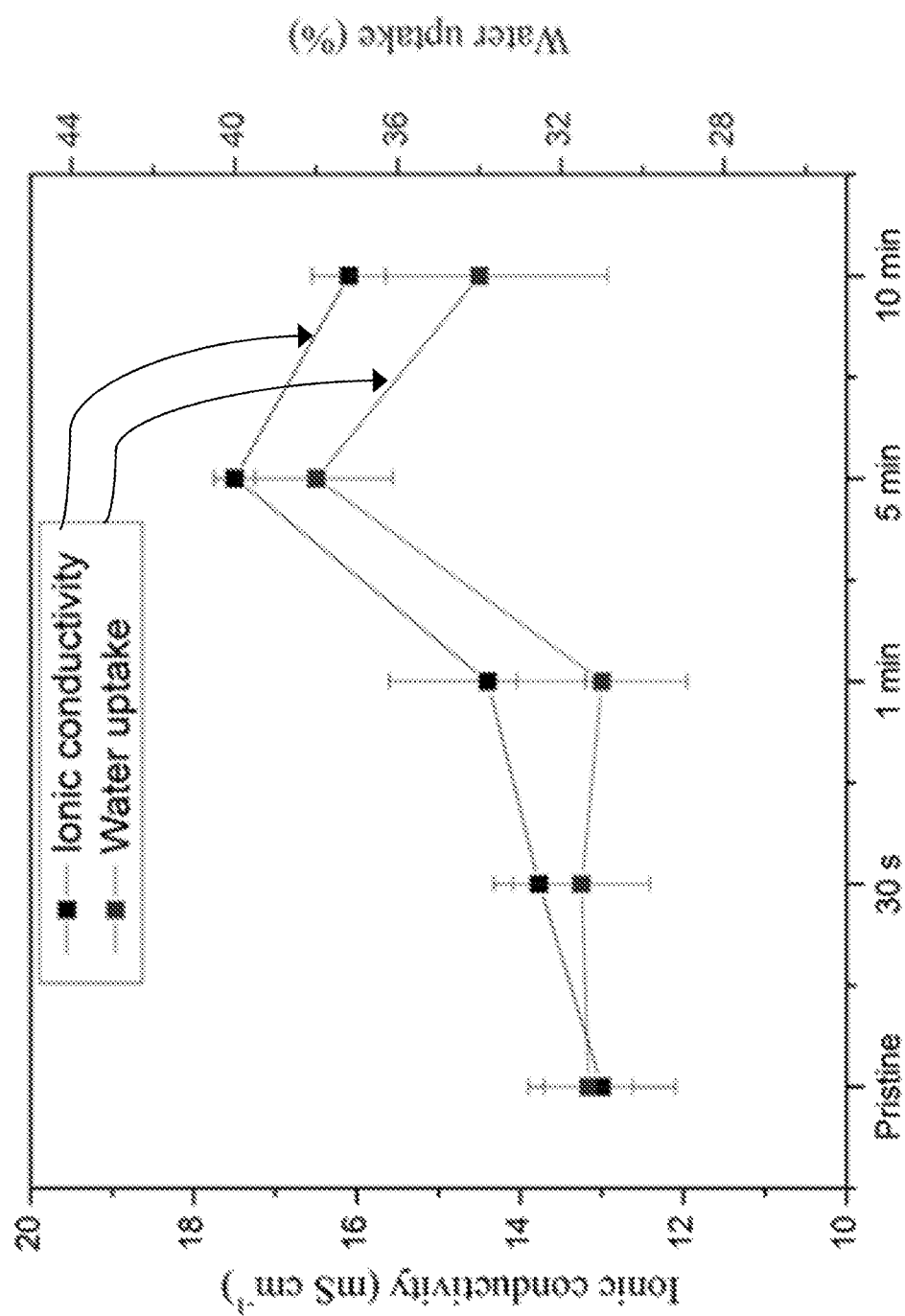
FIG. 14 is an exemplary embodiment of impact of the SiO$_2$ filler quantity on conductivity and water uptake of in-situ composite QPEK-C-TMA+SiO$_2$ in accordance with the present disclosure.

Water uptake. The water uptake values are listed in Table 2. An inverse correlation between the metal oxide content and the water uptake was observed for the ex-situ composite membranes. FIG. 13A and FIG. 13B show the impact of filler quantity on conductivity and water uptake in ex-situ composite QPEK-C-TMA+TiO$_2$ and ex-situ composite QPEK-C-TMA+SiO$_2$, respectively. FIG. 14 shows impact of the SiO$_2$ filler quantity on conductivity and water uptake of in-situ composite QPEK-C-TMA+SiO$_2$. FIG. 15 shows filler quantity corresponding to various immersion times.

Figure 16A:
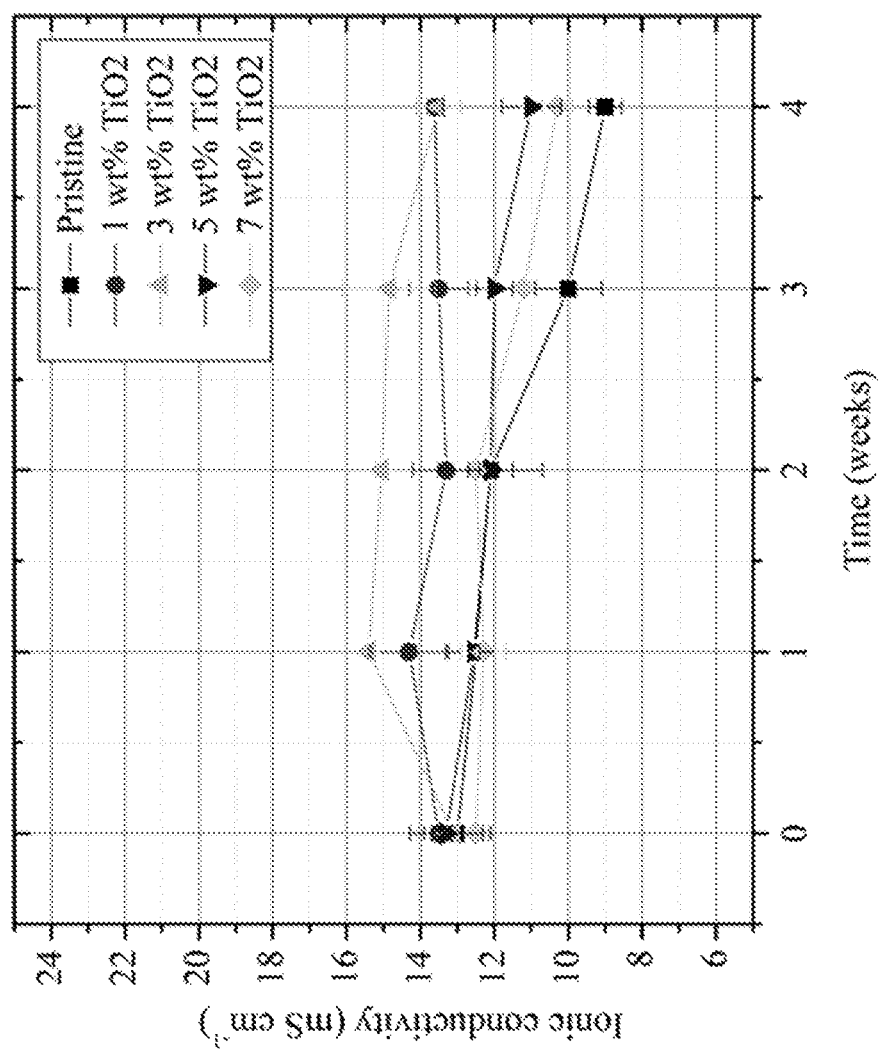
FIGS. 16A-C are exemplary embodiments of variation of conductivity over the course of the stability test of ex-situ composites in accordance with the present disclosure.
Figure 16B:
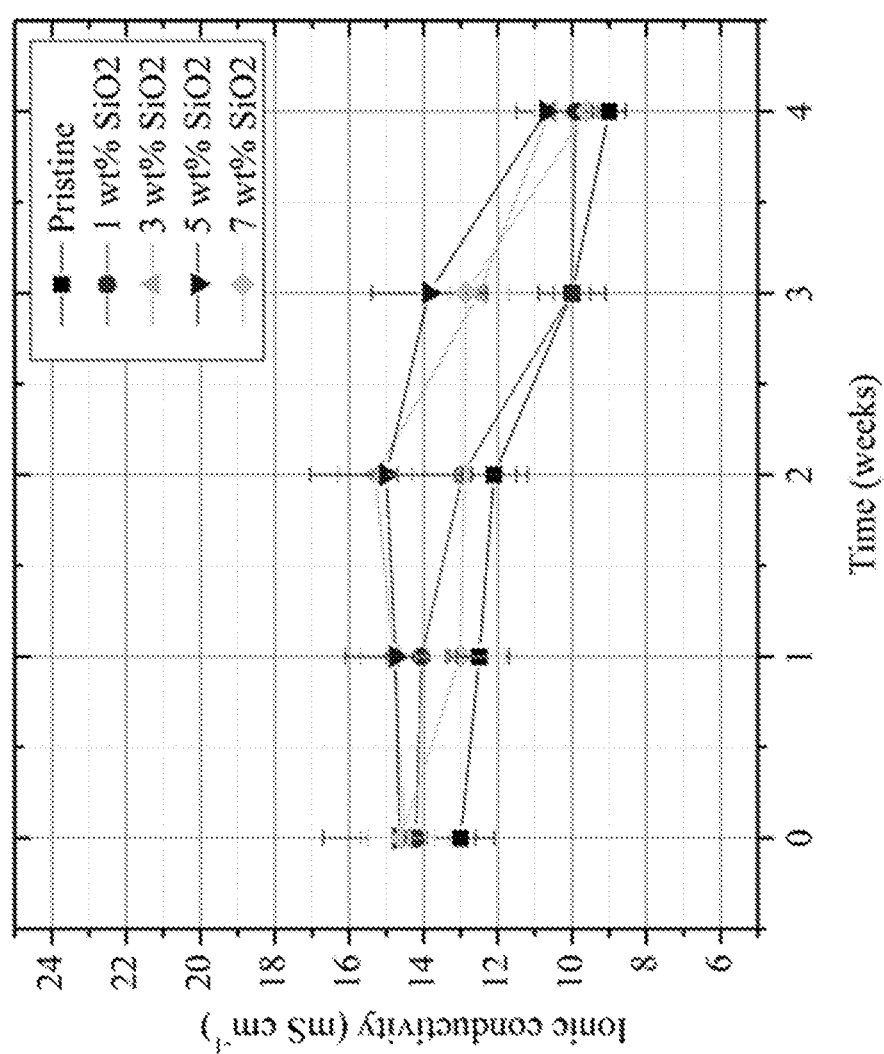
Figure 16C:
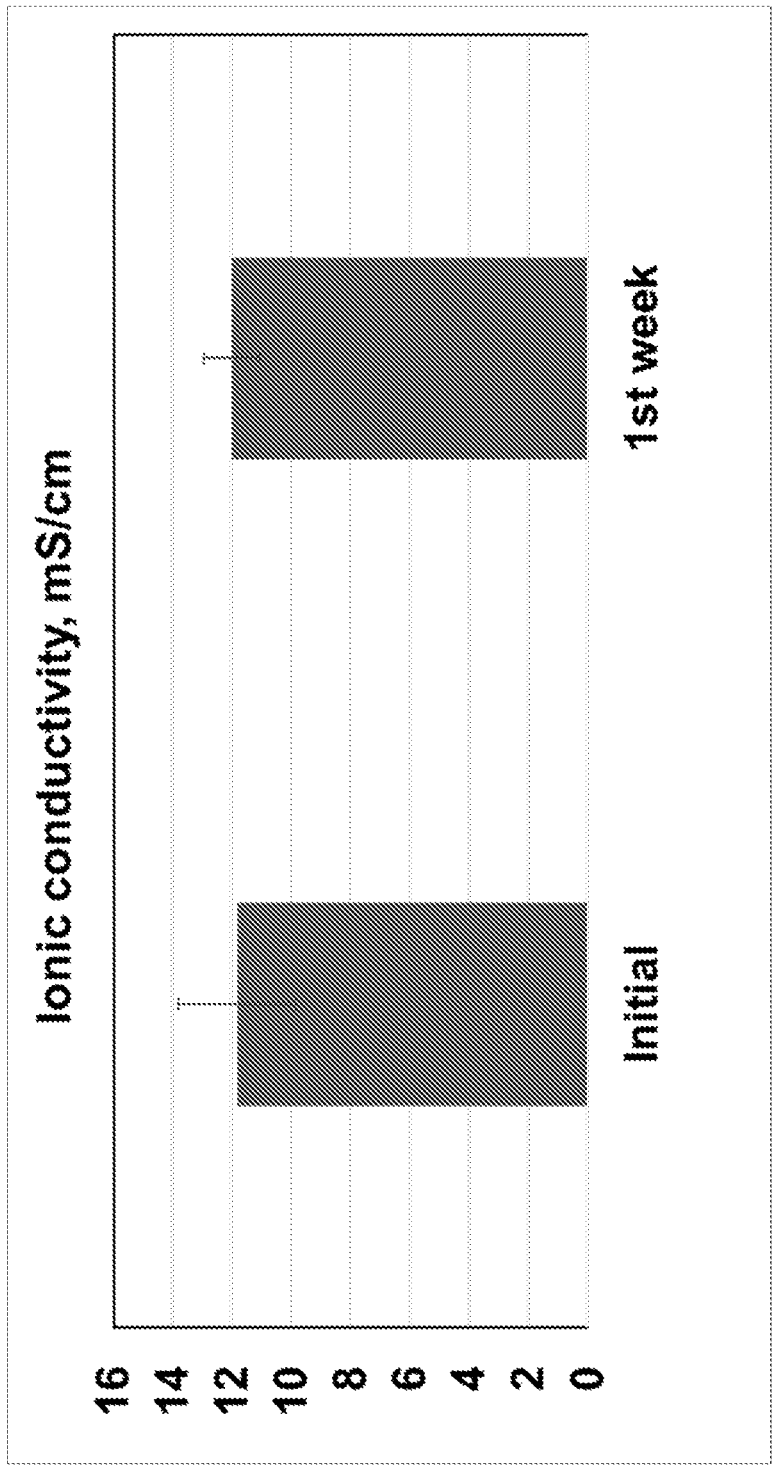
Figure 17:
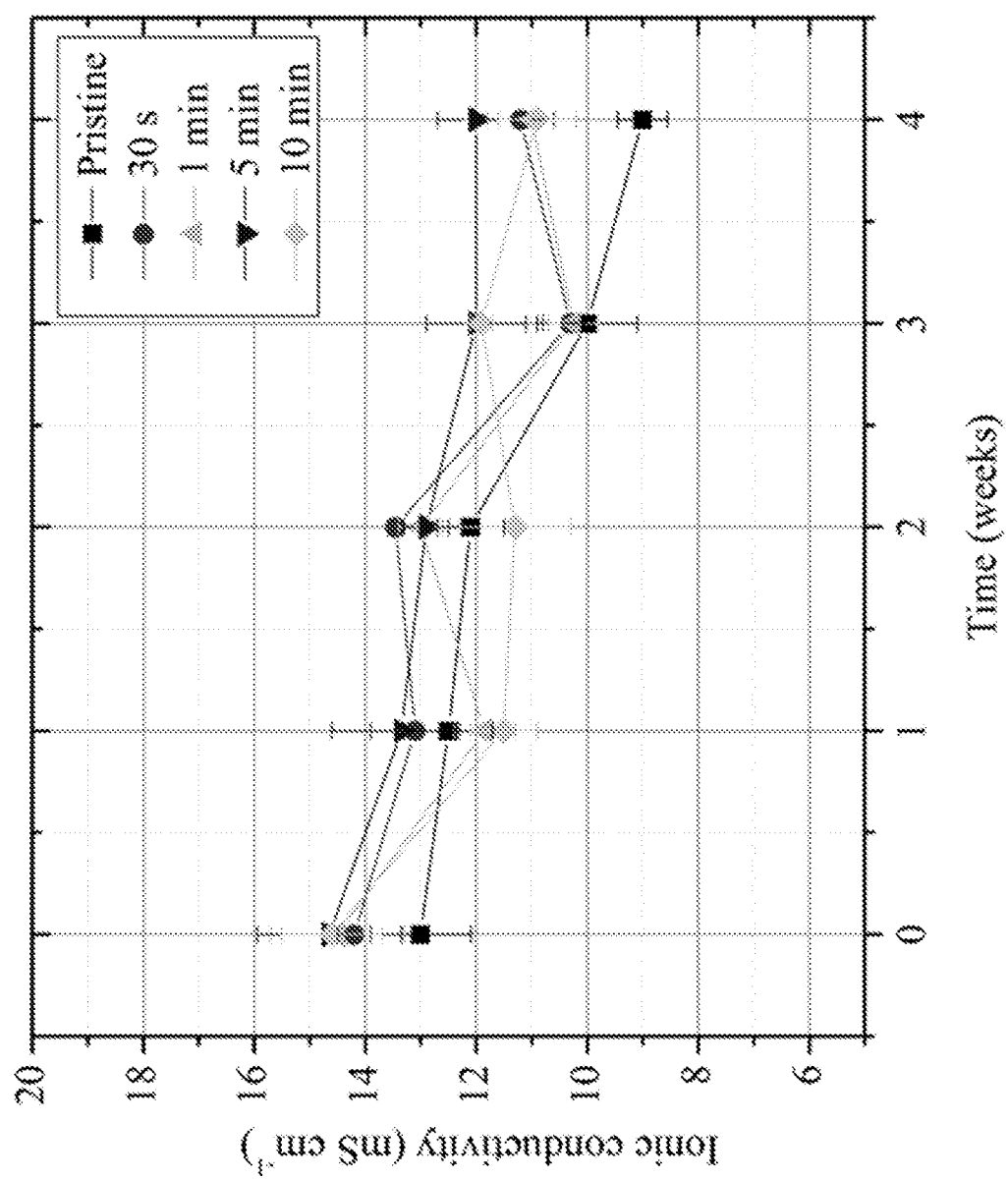
FIG. 17 is an exemplary embodiment of membrane stability tests for the in-situ composite membranes in accordance with the present disclosure.

Conductivity stability. FIGS. 16A-C depict the variation of conductivity over the course of the stability test of ex-situ composites. FIG. 16A shows conductivity over the course of the stability test of an ex-situ composite QPEK-C-TMA+TiO$_2$. FIG. 16B shows conductivity over the course of the stability test of an ex-situ composite QPEK-C-TMA+SiO$_2$. FIG. 16C shows conductivity over the course of the stability test of an ex-situ composite QPEK-C-TMA+Al$_2$O$_3$. FIG. 17 illustrates results of membrane stability tests based on ionic conductivity for the in-situ composite membranes.

Figure 18:
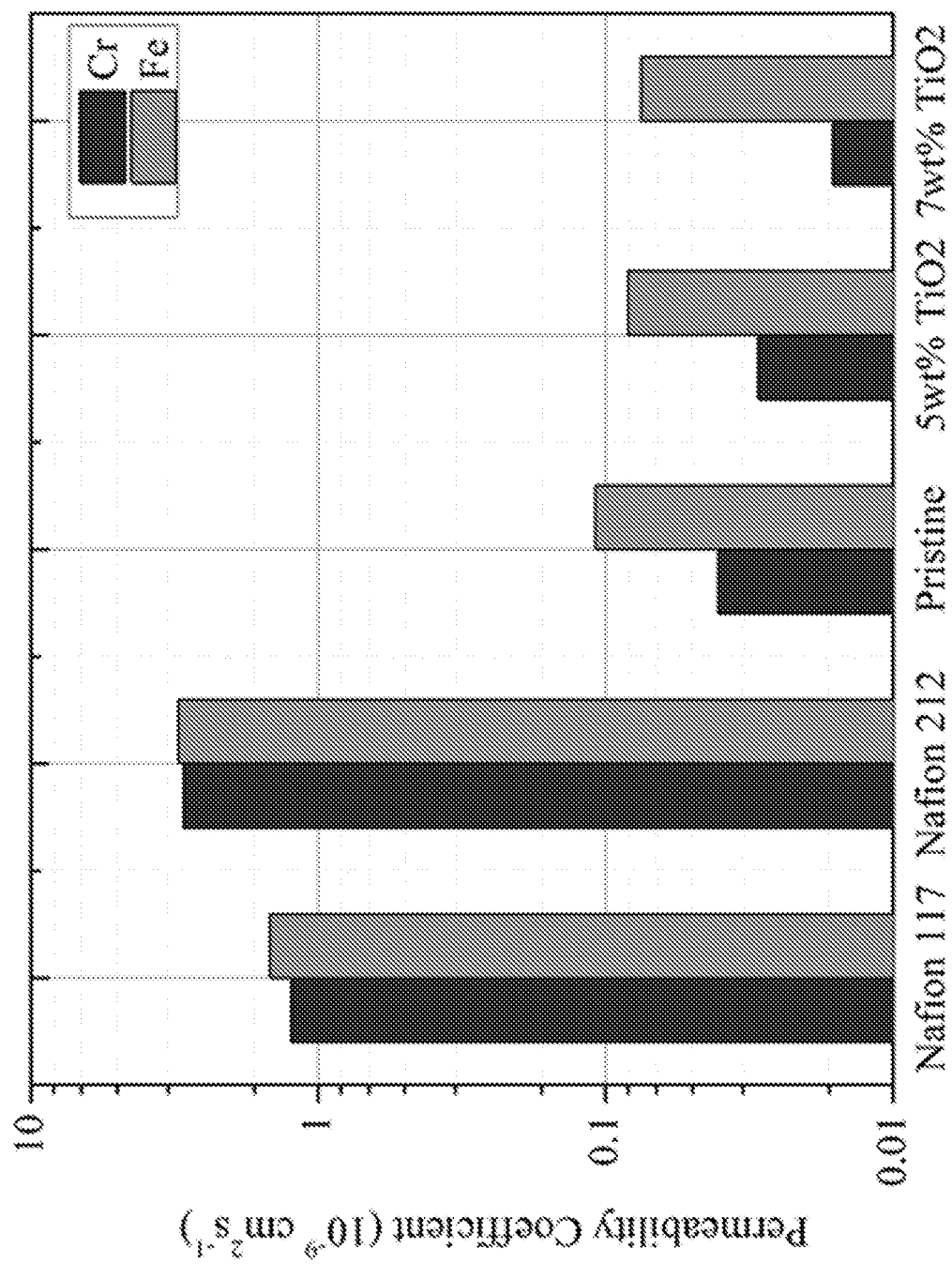
FIG. 18 is an exemplary embodiment of a comparison of the permeability coefficients for some ex-situ composite membranes in accordance with the present disclosure.
Figure 19:
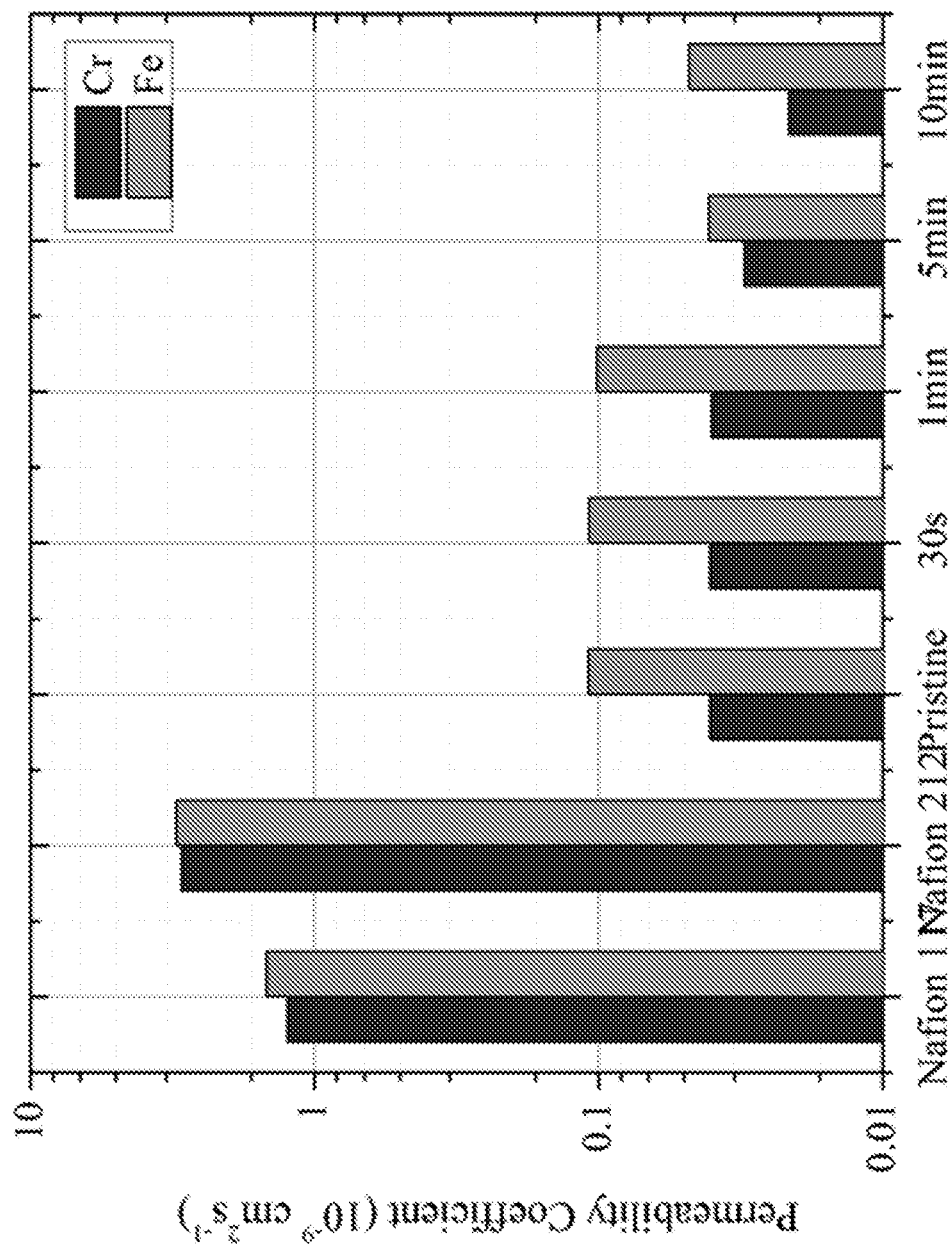
FIG. 19 is an exemplary embodiment of a comparison of the permeability coefficients for some in-situ composite membranes in accordance with the present disclosure.

Permeability. FIG. 18 shows a comparison of the permeability coefficients for some ex-situ composite membranes, while FIG. 19 shows a comparison of the permeability coefficients for some in-situ composite membranes.

Figure 20:
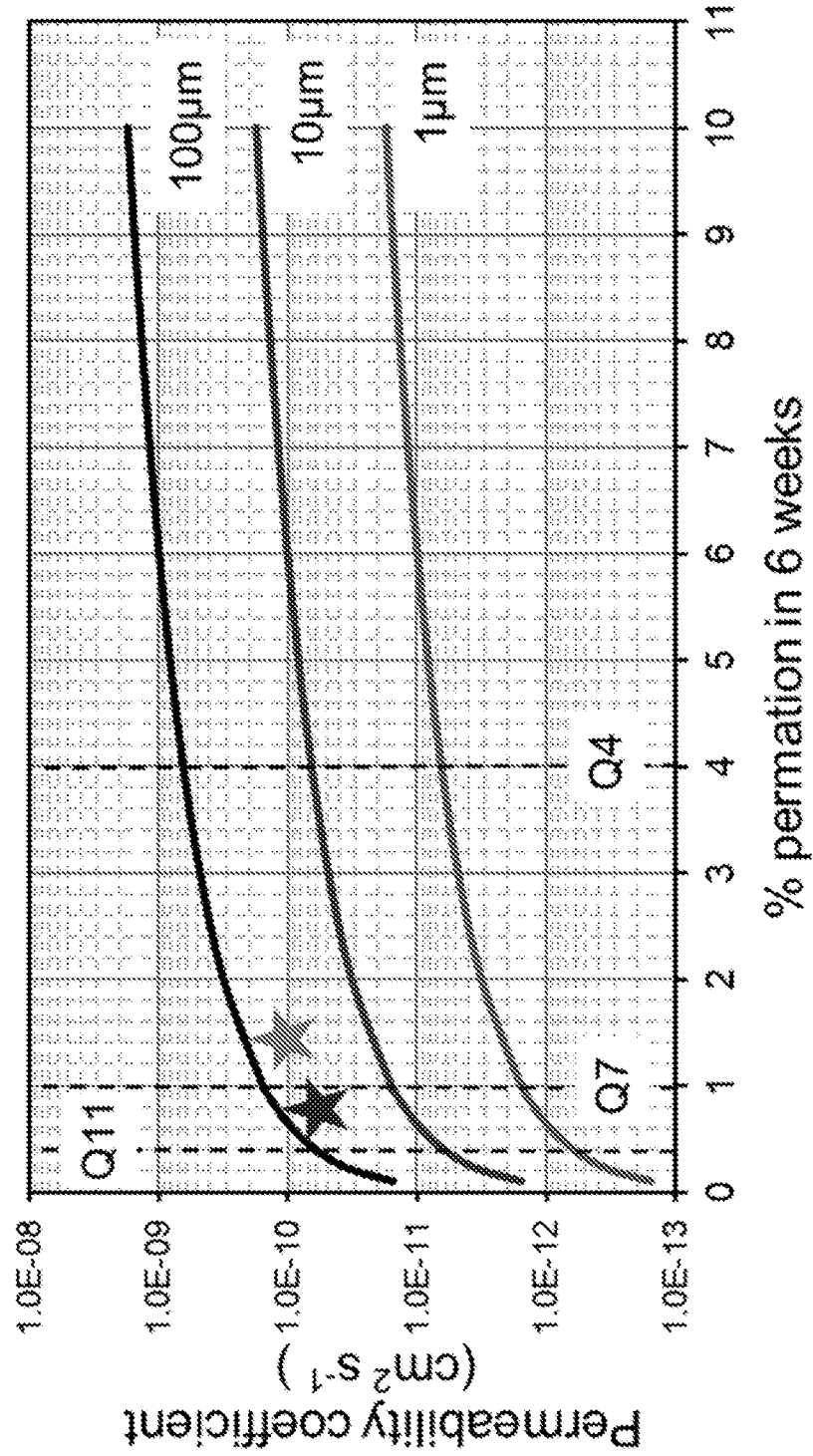
FIG. 20 is an exemplary embodiment of a summary of cross-over rates achieved using in-situ composite QPEK-C-TMA+SiO$_2$ (lower left (red) star) and ex-situ composite QPEK-C-TMA+TiO$_2$ (upper right (green) star) in accordance with the present disclosure.
Figure 21A:
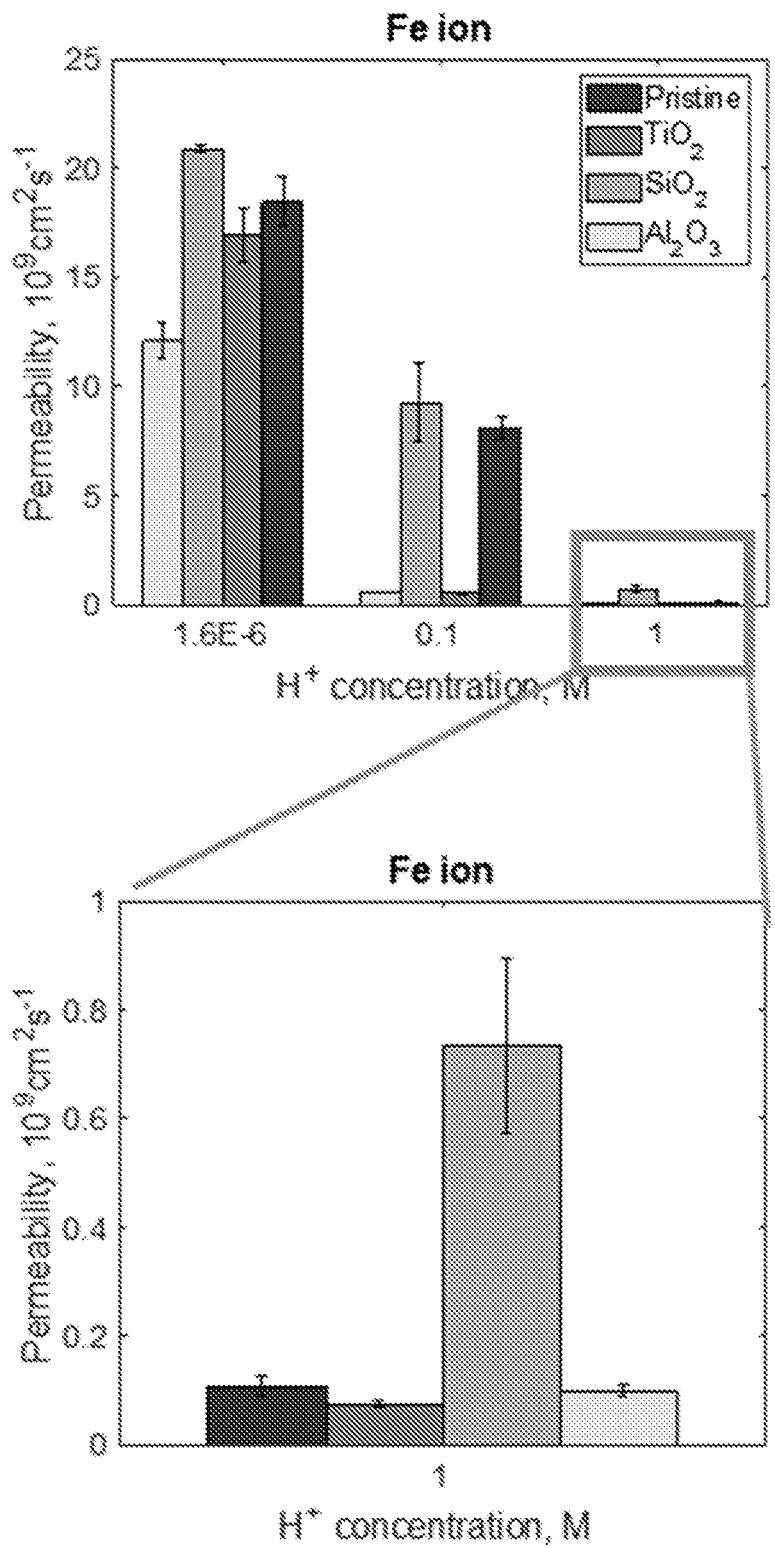
FIG. 21A is an exemplary embodiment of impact of pH on the permselectivity of composite membranes with respect to the Fe ion in accordance with the present disclosure.
Figure 21B:
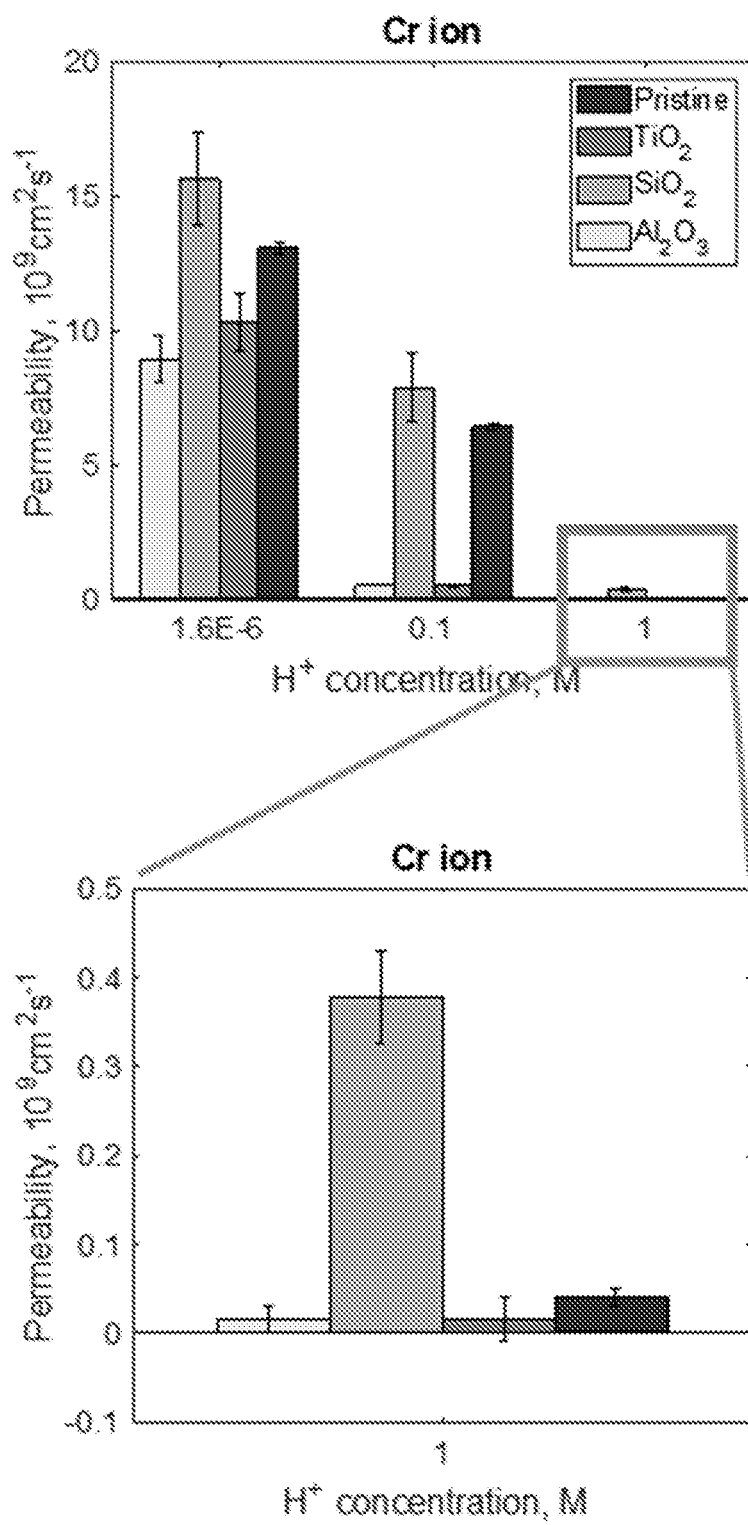
FIG. 21B is an exemplary embodiment of impact of pH on the permselectivity of composite membranes with respect to the Cr ion in accordance with the present disclosure.
Figure 32B:
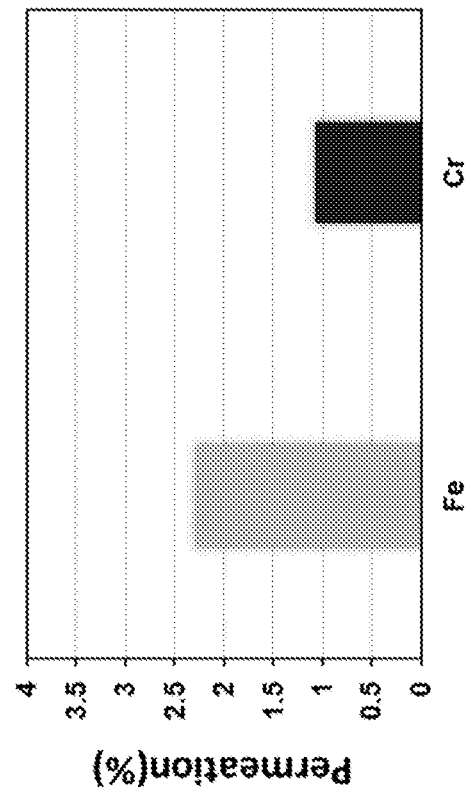
FIGS. 32A-B are exemplary embodiments of a 6-week permeation test of reinforced CMSEBS30-TRIS in accordance with the present disclosure.
Figure 32A:
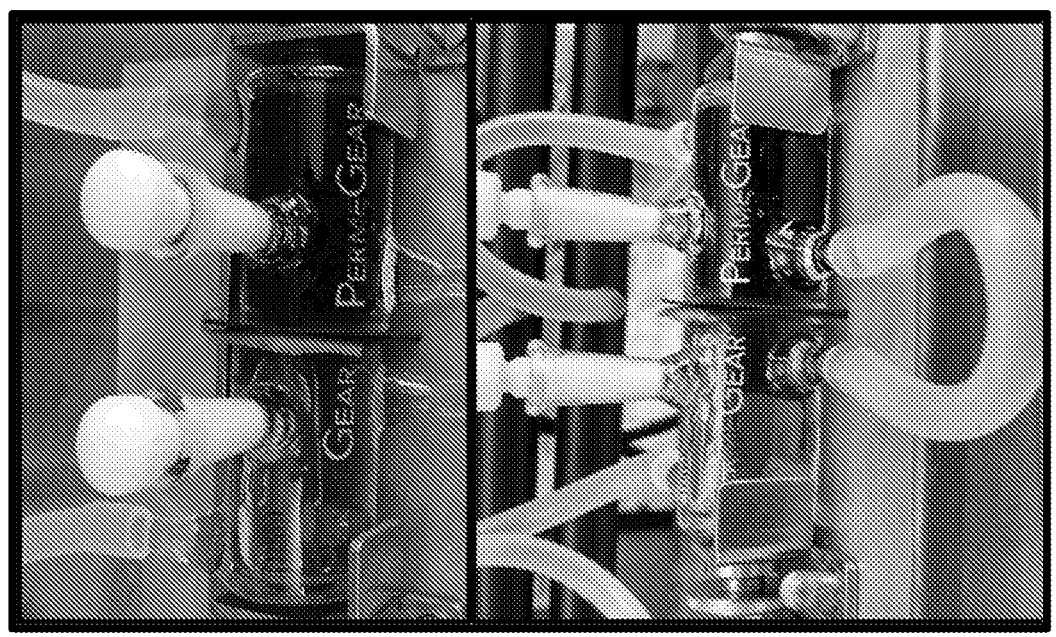

Cation cross-over. The cation cross-over was determined using a diffusion cell (as shown in FIG. 32A) by UV-vis spectroscopy. Iron and chromium electrolytes were chosen to examine the ability of the fixed charges on the AEM backbone to repel cations and ensure selectivity. To allow the comparison of cross-over values across experiments, an intensive, time independent measure, the permeation coefficient was used to describe the cross over rates (see FIGS. 20 and 21A-B). FIG. 20 is a summary of cross-over rates achieved using in-situ composite QPEK-C-TMA+SiO$_2$ (lower left (red) star) and ex-situ composite QPEK-C-TMA+TiO$_2$ (upper right (green) star). FIGS. 21A-B show the impact of pH on the permselectivity of composite membranes.

The permeation coefficient is defined as follows—

$$P = \left( \frac{\ln\left(1 - \left(\frac{2C_r}{C_0}\right)\right)\left(-\frac{Vl}{2A}\right)}{t} \right)$$

where $C_r$ is the concentration measured at the receiving reservoir (determined using UV-Vis spectroscopy), $C_0$ is the active species concentration in the other electrolyte tank (0.5 M or 0.9 M), V is the volume of the receiving side (1 L), l is the membrane thickness (60-70 µm), A is the membrane area (25 cm$^2$), and t is the time.

Permselectivity and transport numbers. Permselectivity was tested to establish the ability of the membranes to selectively allow anions to cross though while preventing cation cross-over. Membrane permselectivity and transport numbers were measured using the membrane potential method in a lab-made diffusion cell. The AEM was clamped between two well-stirred compartments containing different concentrations of the same salt (0.1 M and 0.5 MKCl). Two identical calomel reference electrodes were used to measure the potential difference (Es (mV)) between the two solutions arising from the different mobilities of chloride and potassium ions through the membrane. The membrane potential was used to calculate the membrane permselectivity (selectivity of the anion exchange membrane toward anions) and the transport numbers (in this case for chloride and potassium). The following equation [4] was used to calculate anion and cation transport numbers and membrane permselectivity:

$$E_m = (2t_- - 1)\left(\frac{RT}{F}\right) \ln\left(\frac{a_A}{a_B}\right) = (t_- - t_+)\left(\frac{RT}{F}\right) \ln\left(\frac{a_A}{a_B}\right)_1 \quad [4]$$

Where t+ and t− are the transport numbers for the cation ($K^+$) and the anion ($Cl^-$) respectively, $a_A$ and $a_B$ the activities of the electrolyte (KCl) in the concentrated and diluted compartments separated by the membrane, T the absolute temperature, R is the gas constant and F is the Faraday constant. The coefficient (2t−1) is commonly referred as the membrane permselectivity and represents the difference between the transport numbers for anions and cations.

Effect of pH, Ionic Strength and Surface Charge on Permselectivity of Composite Membranes The addition of metal oxide fillers to the CPEK membranes was found to significantly improve the permselectivity of these membranes. Interestingly, in-situ composite membranes where the filler content was 1/10 of the content in ex-situ composite membranes were found to exhibit greater permselectivity. Thus, the cationic permselectivity was found to be more than just a function of charge-based repulsion (Donnan exclusion) or physical blocking of the ion-conducting channels. Thus, the mechanism of the high permselectivity found in the composite membranes is investigated as a function of the surface charge on the metal oxide particles. All measurements reported here were carried out on bare metal oxide particles and these particles were incorporated into the composite membranes using the ex-situ method. This was done to avoid any additional contributions from the tetraethyl orthosilicate (TEOS) and N-(trimethoxysilyl)propyl-N,N,N-trimethylammonium chloride (TMSPTMA) precursors used in the in-situ composite membranes.

Since the surface charge on a metal oxide particle in an ionomer solution (or any solution) can be defined at various points in the electrical double layer, the Zeta potential is utilized herein to characterize the surface charge. The Zeta potential is the electrical potential at the location of the slipping plane relative to a point in the bulk fluid away from the interface. Zeta potential was measured for various metal oxides of interest at different pH values. The results are summarized in FIG. 22, which illustrates Zeta potential as a function of pH for $SiO_2$, $TiO_2$ and $Al_2O_3$. The low pH region is of interest in RFB application and in this region, the Zeta potentials were in the following order—$Al_2O_3$>$TiO_2$>$SiO_2$. Upon incorporating these metal oxides in a CPEK-TMA composite, the permeation coefficient was found to be inversely related to the surface charge, supporting charge-based exclusion of the cations. Interestingly, when a largely neutral metal oxide like $SiO_2$ is incorporated into CPEK-TMA, the permeation coefficient was found to be higher than that of the pristine membranes, as supported by the increase in membrane thickness without any concomitant increase in electrostatic repulsion of the cations.

Acid uptake. The acid uptake values are listed in Table 2 and were found to correlate with the water uptake measurements.

Tensile tests. These were performed according to the following test conditions to best simulate the conditions in an operating RFB—

Test condition: Controlled force with a tension clamp
Sample size: 3 mm×0.5 mm (L×W)
Temperature: 40° C.
Relative humidity: 50%
The test protocol was:
Equilibrate to test temperature
Achieve humidity condition,
Hold for 20 min isothermal
Ramp up at 0.5 MPa/min to break Microstructure characterization. SEM analysis of the surface and cross-sectional structure of the membranes and AFM analysis of the surface morphology was carried out. The surface was found to be uniform while the cross section showed some aggregation of the metal oxide particles. The AFM topographic images show fairly uniform surfaces with the ex-situ membranes displaying greater uniformity perhaps due to the lower metal oxide content. The images are depicted in FIGS. 23A-C and 24A-B.

TABLE 2

Properties of QPEK-C composite AEMs with $TiO_2$ fillers compared to the pristine membrane.

|  | Pristine | QPEK-C-TMA + 20% $SiO_2$ | QPEK-C-TMA + 1% $TiO_2$ | QPEK-C-TMA + 3% $TiO_2$ | QPEK-C-TMA + 5% $TiO_2$ | QPEK-C-TMA + 7% $TiO_2$ |
|---|---|---|---|---|---|---|
| Experimental IEC (mmol/g) | 1.71 ± 0.09 | 1.33 ± 0.13 | 1.61 ± 0.01 | 1.63 ± 0.10 | 1.67 ± 0.05 | 1.63 ± 0.04 |
| Chloride conductivity (@ 40° C., mS/cm) | 13.1 ± 1 | 13 ± 1.6 | 13.5 ± 0.1 | 13.3 ± 1.1 | 13.5 ± 0.76 | 12.5 ± 0.2 |
| Ultimate tensile stress (MPa) | 35.3 ± 1.3 | n/a | 35.9 ± 0.9 | 36.5 ± 1.0 | 37.9 ± 0.6 | 37.03 ± 0.8 |
| Elongation at break (%) | 52.21 ± 1.6 | n/a | 50.33 ± 2.4 | 46.94 ± 1.5 | 40.56 ± 0.9 | 32.52 ± 1.1 |
| Membrane permselectivity | 0.909 | n/a | 0.880 | 0.883 | 0.914 | 0.919 |
| Transport number ($t_{Cl^-}$; $t_{K^+}$) | 0.954; 0.046 | n/a | 0.940; 0.060 | 0.941; 0.059 | 0.957; 0.043 | 0.960; 0.040 |
| Young's modulus (GPa) | 0.34 ± 0.01 | n/a | 0.38 ± 0.03 | 0.36 ± 0.02 | 0.36 ± 0.01 | 0.37 ± 0.03 |
| Water uptake (%) | 31.5 ± 2.5 | 42.2 ± 1.68 | 33 ± 5 | 304.6 | 29 ± 4.6 | 29.8 ± 7.5 |
| Swelling ratio (%) | n/a | 5.97 ± 0.48 | n/a | n/a | 6.49 ± 0.04 | 5.94 ± 0.51 |
| Acid uptake (%) | n/a | 54 ± 1.96 | n/a | n/a | n/a | n/a | n/a: not available

TABLE 3

Properties of the various in-situ composite membranes. The SiO$_2$ content corresponding to the various TMPS immersion times are given in FIG. 15.

| Properties | Pristine | TMPS 30 s | TMSP 1 min | TMSP 5 mins | TMSP 10 mins |
|---|---|---|---|---|---|
| IEC (mmol/g) | 1.71 ± 0.09 | 1.61 ± 0.03 | 1.59 ± 0.02 | 1.59 ± 0.06 | 1.52 ± 0.01 |
| Membrane permselectivity | 0.909 | 0.897 | 0.900 | 0.905 | 0.914 |
| Transport number ($t_{cl-}$; $t_{K+}$) | 0.954; 0.046 | 0.949; 0.051 | 0.950; 0.050 | 0.952; 0.048 | 0.957; 0.043 |
| Ultimate tensile stress (MPa) | 35.3 ± 1.3 | 21.71 ± 0.05 | 27.31 ± 1.2 | 25.90 ± 1.1 | 26.3 ± 2.3 |
| Young's modulus (GPa) | 0.34 ± 0.01 | 0.43 ± 0.05 | 0.42 ± 0.10 | 0.36 ± 0.02 | 0.35 ± 0.04 |
| Elongation at break (%) | 52.21 ± 1.60 | 24.66 ± 0.03 | 22.33 ± 0.05 | 24.63 ± 1.24 | 14.50 ± 1.34 |

Reinforced Anion Exchange Membranes

A pathway to improve the selectivity of IEMs is to increase the number of charged groups attached to the polymeric backbone. Unfortunately, this strategy will not indefinitely improve the selectivity of IEMs as water is a polar molecule and upon exposure to an aqueous environment, the IEM will uptake water typically in proportion to the quantity of charged species attached to the backbone. The resultant swelling is detrimental to the mechanical integrity of the IEMs and in extreme cases will lead to gelation of the IEM. Thus, the selectivity and mechanical properties of a IEM are anti-correlated. A strategy to decouple these properties is by encasing/reinforcing the IEM in a mechanically robust, non-functionalized matrix typically made of other suitable polymers. This approach has been applied to CEMs with great success (e.g., the Gore-Select line of reinforced CEMs for fuel cell applications).

Embodiments directed to reinforced anion exchange membranes provide very permselective AEMs which are also made highly mechanically robust by the reinforcement treatment. Further, a composite AEM consisting of a functionalized ionomer with TiO$_2$ suspended in it (as described herein above) was also reinforced and exhibited excellent permselectivity.

The SEBS based AEM with the Tris(2,4,6-trimethoxyphenyl) phosphine (TRIS) cation, and the quaternized cardo-poly(ether ketone) (QPEK-C) based AEM functionalized with the trimethylamine (TMA) cation, including both ex-situ and in-situ composite membranes, were prepared and functionalized as described herein above. After the SEBS-TRIS synthesis reaction, it was observed that CMSEBS35 and CMSEBS55 membranes both broke apart. Thus, all further studies and the reinforcement itself were carried out for the SEBS30-based TRIS ionomer and the QPEK—C-based TMA ionomer.

Manufacture of Reinforced Membranes

The reinforced membranes using CMSEBS30-TRIS produced by process 1 (shown above) or CMQPEK-TMA-TiO$_2$ produced by process 2 (shown above) were prepared using the commercially available Donaldson extended polytetrafluoroethylene (ePTFE). The major considerations when selecting a suitable substrate and ionomer combination are—compatibility of the ionomer solvent and matrix material and wettability of the matrix material with the solvent.

Herein, chlorobenzene was used with the chloromethylated SEBS (CMSEBS) and dimethylformamide was used with the QPEK-C-TMA+5 wt % TiO$_2$. Both solvents are compatible with ePTFE and wet it. One particular challenge was the insolubility of the SEBS based AEMs upon addition of the functionalizing cation. Thus, the CMSEBS in chlorobenzene was first incorporated into the reinforcement matrix, dried and then functionalized with TMA. This issue was not encountered with the QPEK based composite AEM wherein the ionomer was readily soluble in DMF and incorporated into the reinforcement matrix without any further processing required following solvent drying.

The reinforced membranes were successfully prepared using two different reinforcement techniques namely surface tension assisted casting on a taunt ePTFE film on a glass plate and by the use of a proprietary polytetrafluoroethylene (PTFE) base. The PTFE base was found to produce more uniform and thinner membranes and hence was adopted for further testing. Both techniques are described below.

Figure 25B:
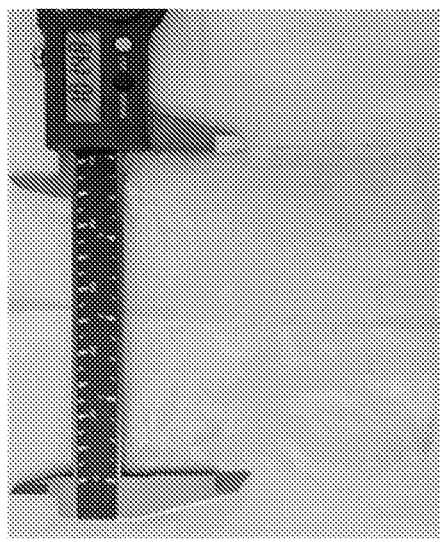
FIG. 25B is an exemplary embodiment of a batch processing method including reinforcement by casting on a proprietary PTFE base in accordance with the present disclosure.
Figure 25B:
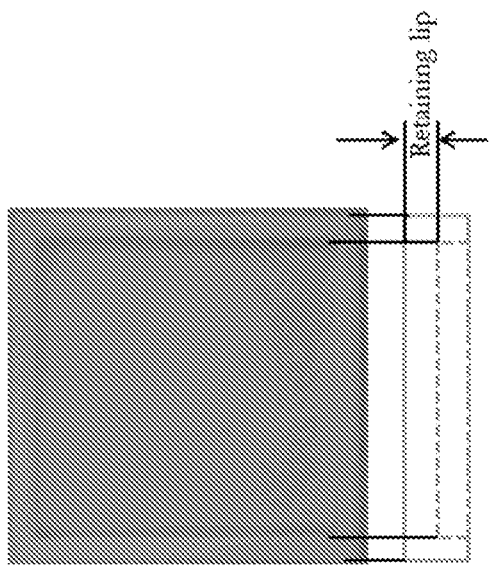
Figure 25A:
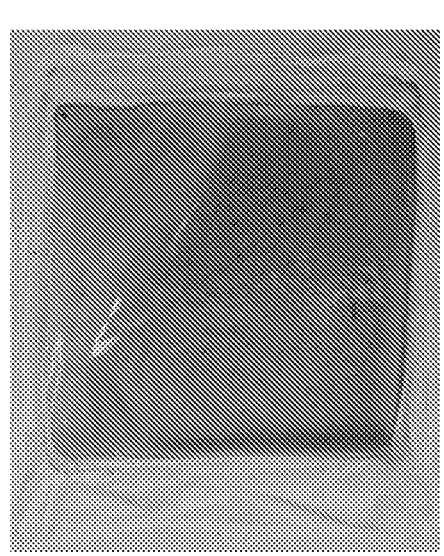
FIG. 25A is an exemplary embodiment of a batch processing method including reinforcement by casting on wetted ePTFE on glass (material retention by surface tension) in accordance with the present disclosure.
Figure 25A:
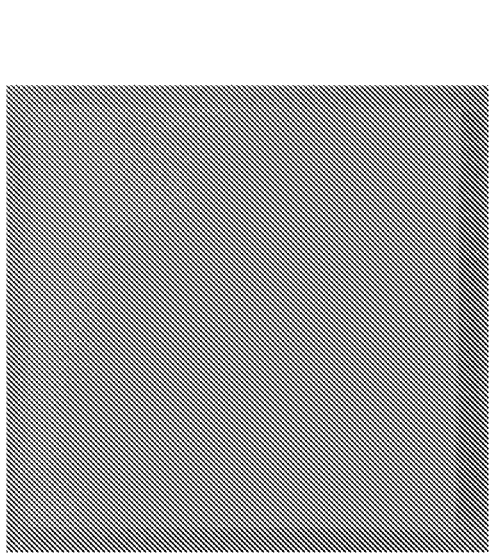

Reinforcement by casting on wetted ePTFE on glass (material retention by surface tension). 10 μm ePTFE films from Donaldson were stretched out on a glass plate with perfectly perpendicular edges (not beveled or polished). The films were wetted with the solvent used to prepare the ionomer solution, mechanically smoothened and ensured to be free of surface defects or blemishes. A suitably concentrated solution of the desired ionomer (or chloromethylated polymer in case of SEBS) was added and allowed to spread. The wet channels in the reinforcement matrix bulk were expected to aid in the incorporation of the ionomer into the matrix by diffusive transport. The solution was retained on the surface by surface tension and the film was allowed to dry in a conventional convection oven at a 40° C. (QPEK-C composites) or 60° C. (CMSEBS). These membranes were relatively thicker (35-40 μm) as the removal of thinner membranes post drying was found to lead to a high percentage of membrane mechanical failure. Representative images of these membranes are provided in FIG. 25A. This process was discontinued in favor of the method using a proprietary PTFE base described in the next section.

Figure 26A:
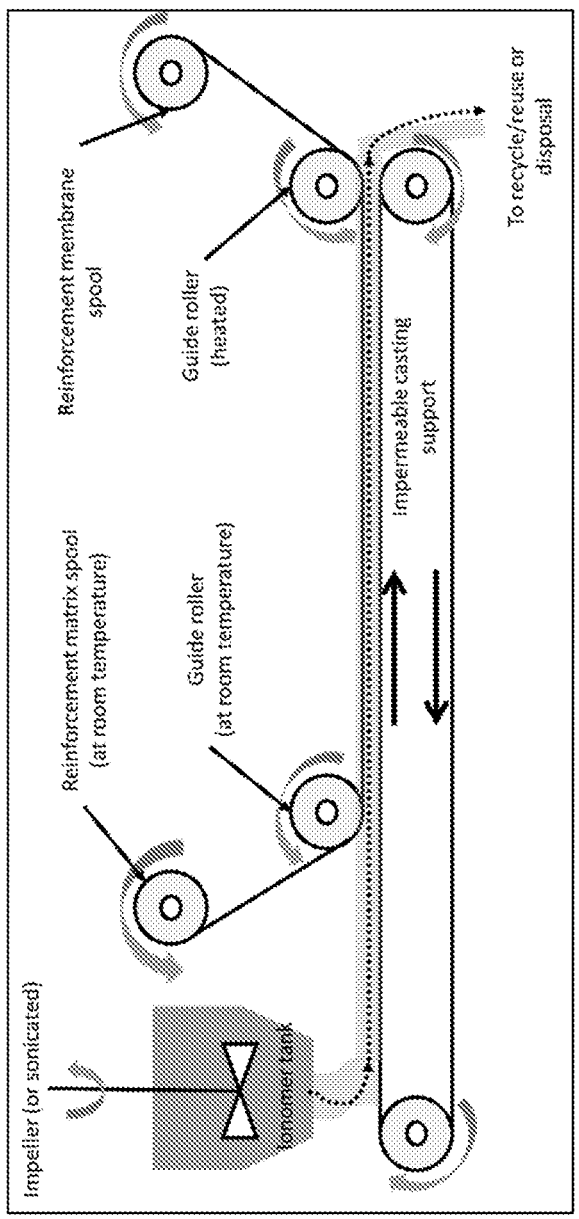
FIG. 26A is an exemplary embodiment of a continuous processing method including reinforcement by diffusive ionomer solution imbibition in accordance with the present disclosure.
Figure 26B:
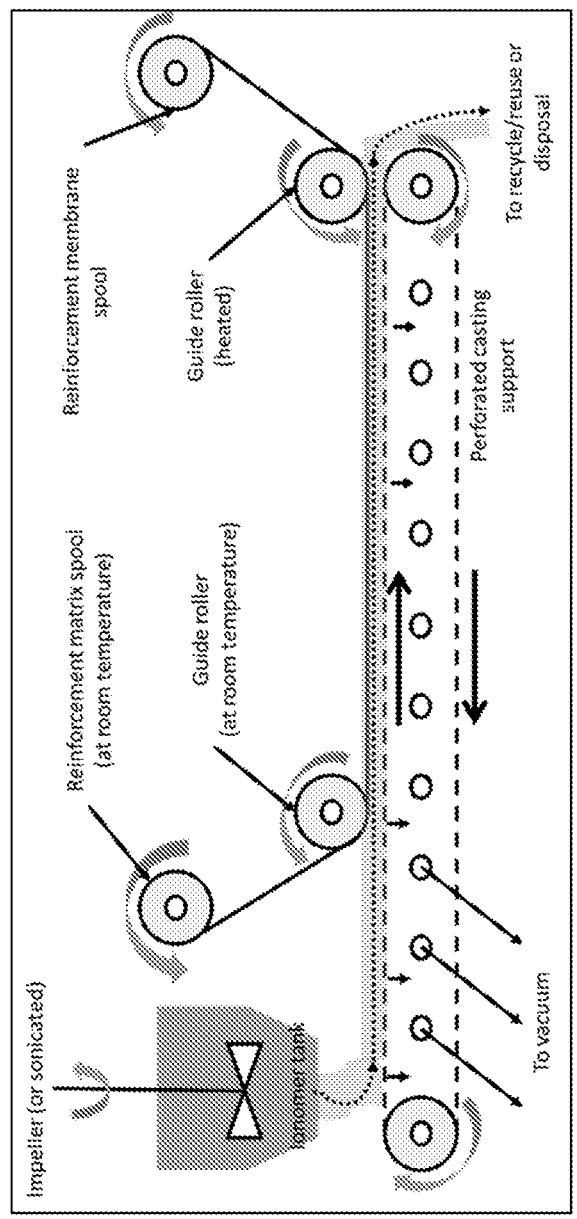
FIG. 26B is an exemplary embodiment of a continuous processing method including reinforcement by vacuum assisted ionomer solution imbibition in accordance with the present disclosure.

Reinforcement by casting on a proprietary PTFE base. A custom-made PTFE base incorporating a lip and a machined base pattern allowing for easy delamination and removal of the finished reinforced membrane was developed. The ePTFE material and solvents used were the same as those described in the previous section. The custom base allowed the development of thinner membranes due to the ease of removal of the finished product and hence ionomer (or chloromethylated polymer) solutions that were half the concentration of that used with the glass casting method were used in this method. This allowed for the development of thinner (15-25 μm) membranes which resulted in lower area specific resistance (ASR) values for the almost the same conductivity. All testing and characterization was carried out on membranes prepared using this method. Representative images of these membranes are provided in FIG. 25B. Embodiments of continuous manufacturing processes based on the ePTFE support method are depicted in FIGS. 26A-B. The methods depicted here are meant to be illustrative and not exhaustive of embodiments within the scope of this disclosure.

Figure 27:
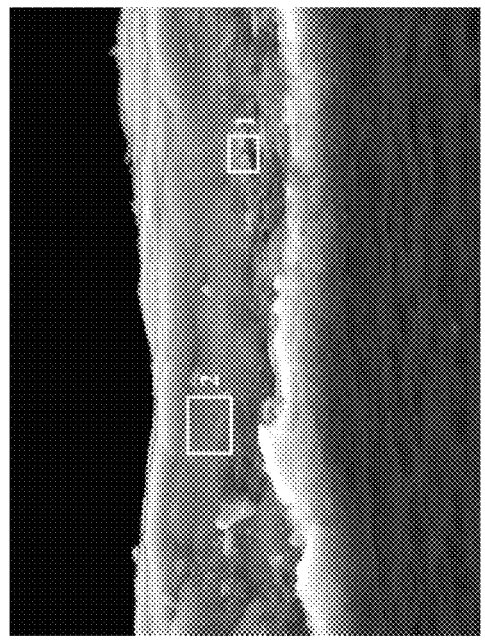
FIG. 27 is an exemplary embodiment of a representative cross-sectional SEM image of reinforced CMSEBS-TRIS with EDAX spectra (1 and 2) showing a uniform distribution of fluorine (from ePTFE) throughout the cross-section in accordance with the present disclosure.
Figure 27:
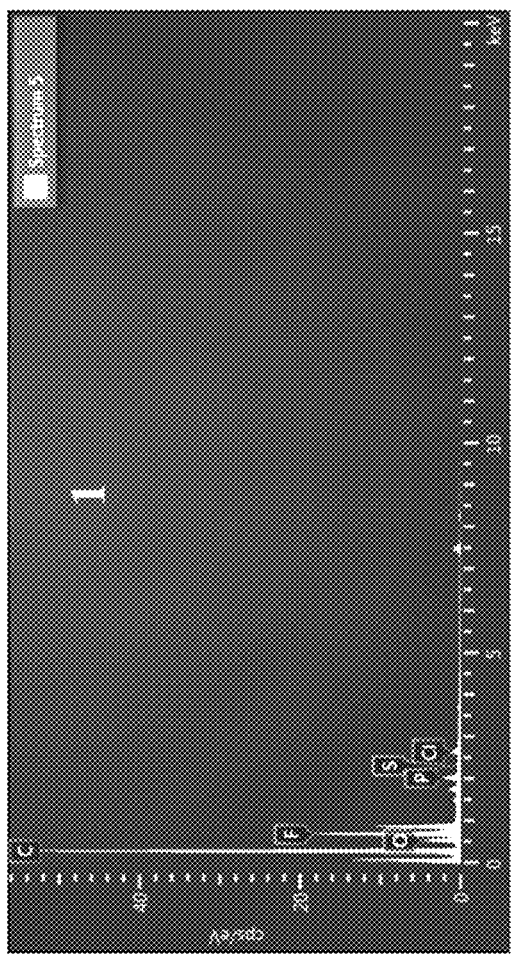
Figure 27:
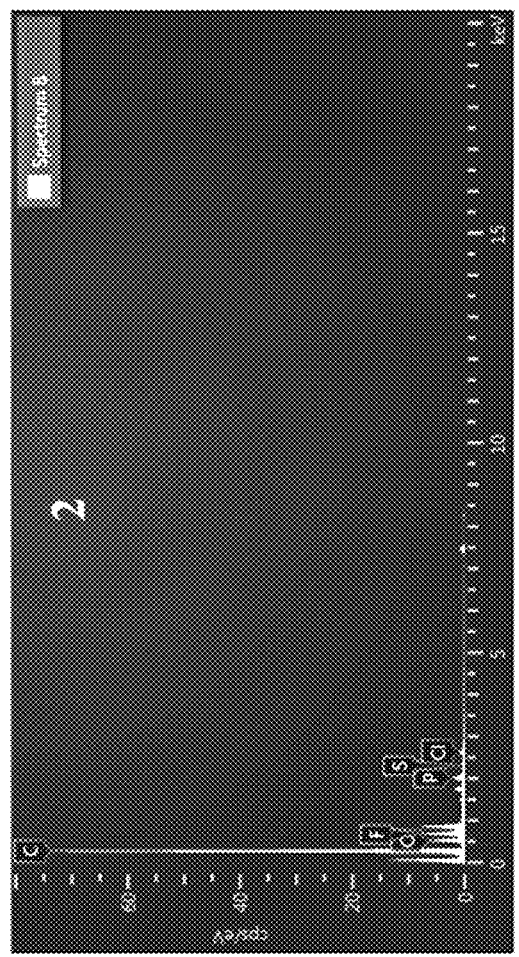

The SEM images of these membranes and energy dispersive analysis of x-rays (EDAX) analysis revealed that the anticipated diffusive transport of the ionomer solution into the pores was occurring. This was clearly observed through the increasing fluoride concentration (present only in the ePTFE) in the inner regions of membrane bulk. This image is depicted in FIG. 27.

Figure 28:
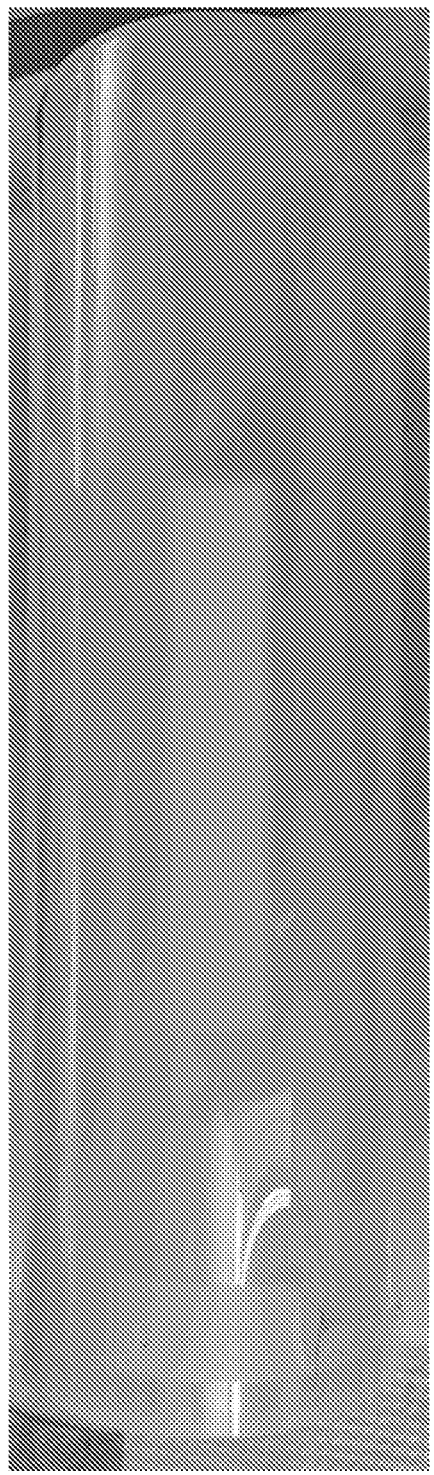
FIG. 28 is an exemplary embodiment of a 2.5 m×0.25 m (L×W) roll of reinforced Polystyrene-Block-Poly(ethylene-ran-butylene)-Block-Polystyrene (SEBS) triblock co-polymer produced by a contract manufacturer using WUSTL supplied materials in accordance with the present disclosure.
Figure 29:
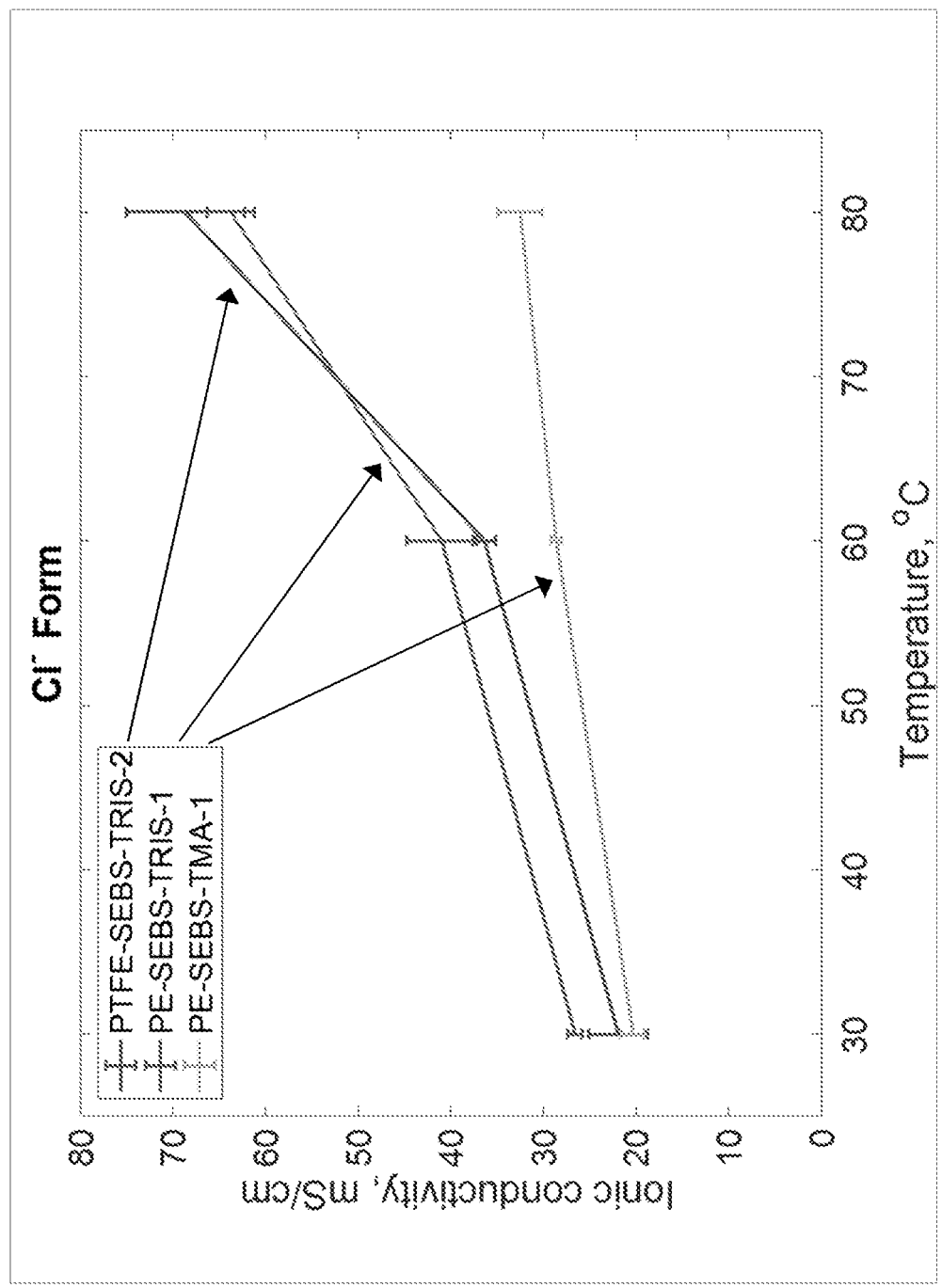
FIG. 29 is an exemplary embodiment of a Cl ion conductivity of various reinforced separators in accordance with the present disclosure.

Scale-up and roll-to-roll production of reinforced SEBS. The reinforced SEBS-TRIS membranes were made with polyethylene (PE) as a reinforcement material in addition to the extended polytetrafluoroethylene (ePTFE) reinforcement material. Given the >50% increase in the tensile strength (see Table 4) when reinforcing SEBS with PE, PE was chosen as the reinforcement material for roll-to-roll production. The membranes reinforced with both materials were scaled up with the aid of a contract manufacturer and made using methods analogous to the roll-to-roll production process detailed in FIGS. 26A and 26B. A contract manufacturer was provided with a further 50 g of CM-SEBS which was then utilized in the producing the roll depicted in the FIG. 28. FIG. 28 shows a 2.5 m×0.25 m (L×W) roll of reinforced Polystyrene-Block-Poly(ethylene-ran-butylene)-Block-Polystyrene (SEBS) triblock co-polymer produced by a contract manufacturer using supplied materials as disclosed herein. 100 cm² sections of the roll were functionalized with the TRIS cation. The Cl ionic conductivity of the PE reinforced SEBS-TRIS separator was found to be significantly higher than values for ePTFE reinforced SEBS-TRIS, as shown in FIG. 29.

TABLE 4

Comparison of polyethylene (PE) and extended polytetrafluoroethylene (ePTFE) reinforced SEBS-TRIS.

|  | ePTFE-SEBS30-TRIS | PE-SEBS30-TRIS |
| --- | --- | --- |
| Experimental IEC (mmol/g) | 0.46 ± 0.09 | 0.51 ± 0.00 |
| Ultimate tensile stress (MPa) | 15.67 ± 0.89 | 39.40 ± 5.53 |
| Elongation at break (%) | 248.40 ± 0.4 | 201.95 ± 16.45 |

Membrane Characterization

Ion exchange capacity. The IEC values listed in Table 5 were measured using the Volhard titration method detailed in previous reports. The values for reinforced SEBS-TRIS were found to be slightly lower than the values in the unreinforced state. This is due to the lower functionalization during the solid-state reaction with the TRIS following the incorporation of CMSEBS into the reinforcement matrix. Since the reinforced QPEK-C-TMA+5 wt % $TiO_2$ was functionalized prior to incorporation into the reinforcement matrix, the IEC was not found to vary compared to the unreinforced membrane within experimental error.

Figure 30A:
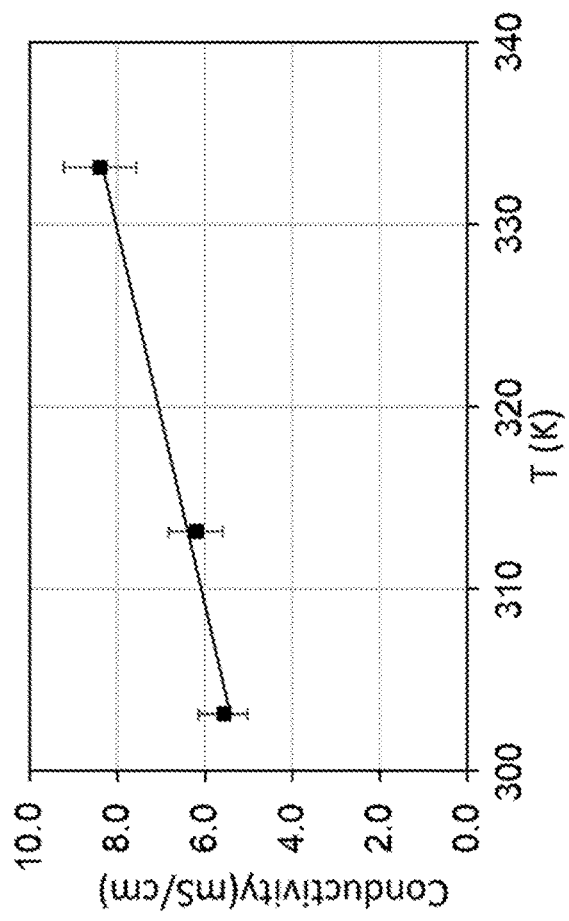
FIG. 30A is an exemplary embodiment of temperature dependence of the conductivity of reinforced CMSEBS-TRIS in accordance with the present disclosure.
Figure 30B:
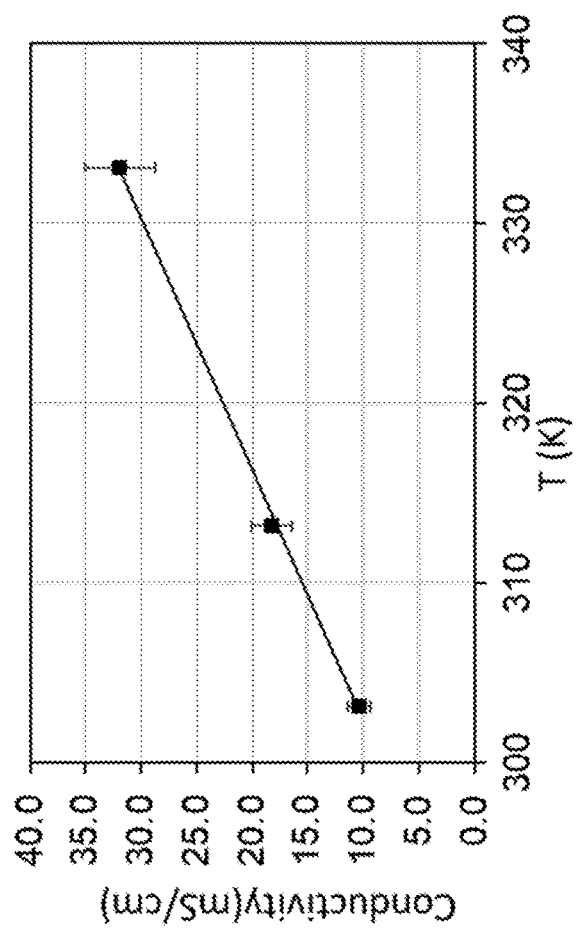
FIG. 30B is an exemplary embodiment of temperature dependence of the conductivity of reinforced QPEK-C-TMA+5 wt % $TiO_2$ in accordance with the present disclosure.

Ionic conductivity. The ionic conductivity and ASR values are listed in Table 5. Both reinforced membranes have sufficient ionic conductivity at 40° C. in DI water to meet the ASR targets of <0.7 Ω-cm². The temperature dependence of conductivity is depicted in FIGS. 30A-B for reinforced CMSEBS-TRIS and reinforced QPEK-C-TMA+5 wt % $TiO_2$, respectively.

Water uptake. The water uptake values listed in Table 5 are substantially lower than the values reported unreinforced membranes. The reinforcement matrix prevents the swelling of the membranes, constrains the growth of pore size and accounts for the observed minimal water uptake. Further, the low water uptake values also explain the observed reduction in permeation of the active species.

Acid uptake. The acid uptake values are listed in Table 5 and follow the same trend compared to the water uptake values.

Figure 31A:
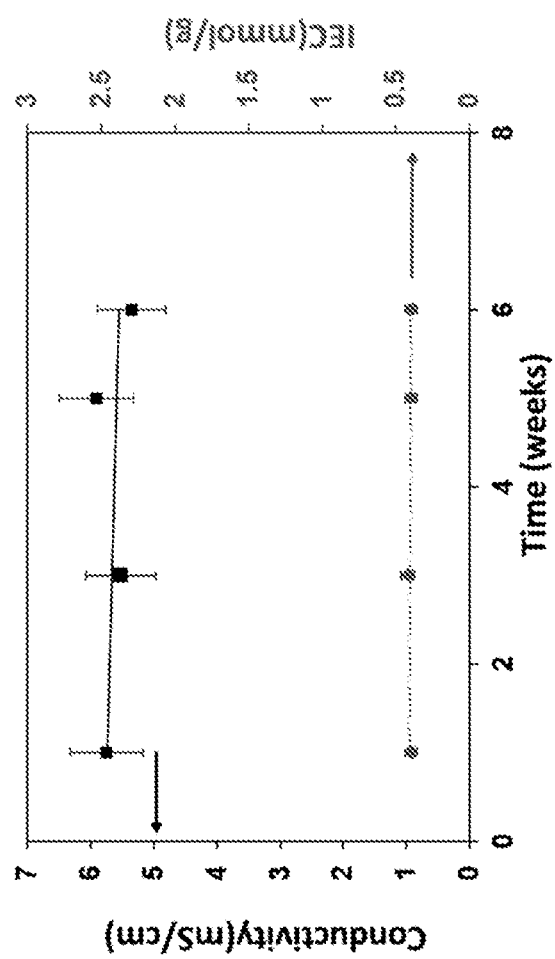
FIG. 31A is an exemplary embodiment of a stability test in a 1 M $FeCl_3$+1 M $CrCl_3$ in 1 M $CH_3SO_3H$ solution of reinforced CMSEBS-TRIS in accordance with the present disclosure.
Figure 31B:
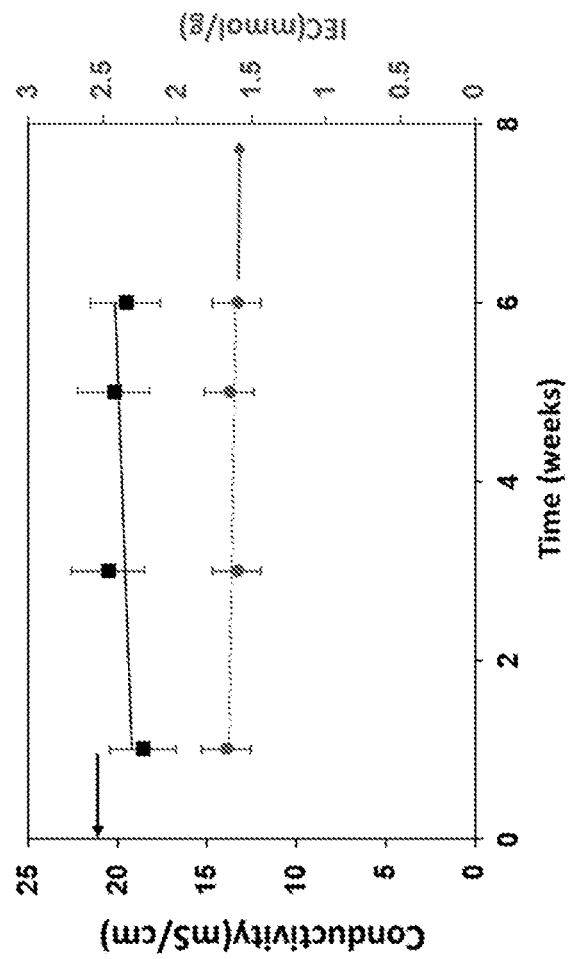
FIG. 31B is an exemplary embodiment of a stability test in a 1 M $FeCl_3$+1 M $CrCl_3$ in 1 M $CH_3SO_3H$ solution of reinforced QPEK-C-TMA+5 wt % $TiO_2$ in accordance with the present disclosure.

Tensile tests. These were performed in both pristine conditions and following a 6-week stability test according to the following test conditions to best simulate the conditions in an operating RFB—
Test condition: Controlled force with a tension clamp
Sample size: 3 mm×0.5 mm (L×W)
Temperature: 40° C.
Relative humidity: 50%
The test protocol was:
Equilibrate to test temperature
Achieve humidity condition,
Hold for 20 min isothermal
Ramp up at 0.5 MPa/min to break Membrane oxidative stability test. Oxidative stability was evaluated ex-situ by immersion of the membranes in 1 M $FeCl_3$+1 M $CrCl_3$ in 1 M $CH_3SO_3H$ for 6 weeks at 40° C. The conductivity and IEC of the samples were measured every two weeks and the mechanical properties were measured at the end of 6 weeks. Samples of the reinforced materials were stable in the Fe—Cr solution. The stability test results are depicted in FIGS. 31A-B. The mechanical properties after stability soak are listed in Table 5.

Figure 33:
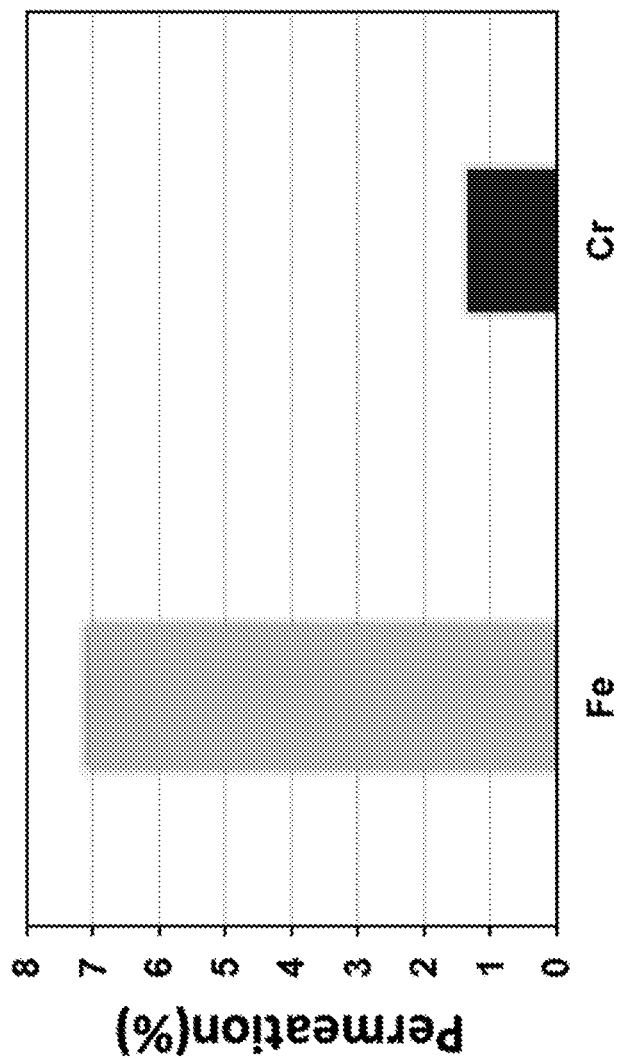
FIG. 33 is an exemplary embodiment of a 6-week permeation test of reinforced CMQPEK-5 wt % $TiO_2$, including permeation rates measured by ICP-OES in accordance with the present disclosure.

Permeation test. The rates of permeation of Fe and Cr was measured using a PermeGear diffusion cell with 10 mL electrolyte volumes on either side and a ~5 cm² membrane exposed to the electrolytes. The electrolyte solutions were 1 M $FeCl_3$ in 1 M $CH_3SO_3H$ and 1 M $CrCl_3$ in 1 M $CH_3SO_3H$ respectively. The permeation rates were calculated by measuring the concentration of Fe on the Cr side and Cr on the Fe side respectively using inductive coupled plasma optical emission spectroscopy (ICP-OES). The image of the diffusion cell setup and the permeation rates are depicted in FIGS. 32A-B and in FIG. 33, respectively.

TABLE 5

Properties of the reinforced CMSEBS30-TRIS AEM and reinforced QPEK-C-TMA + 5 wt % $TiO_2$ AEM.

|  | Reinforced SEBS30-TRIS | Reinforced QPEK-C-TMA + 5 wt % $TiO_2$ |
| --- | --- | --- |
| Experimental IEC (mmol/g) | 0.42 ± 0.04 | 1.67 ± 0.09 |
| Chloride conductivity (@ 40° C., mS/cm) | 5.75 ± 0.3 | 18.58 ± 2 |
| Ultimate tensile stress (MPa) (pristine) | 17.58 ± 0.8 | 14.43 ± 1 |
| Elongation at break (%) (pristine) | 164 ± 15 | 35.8 ± 2 |
| Ultimate tensile stress (MPa) (after stability test) | 12.85 ± 1 | 10.22 ± 1 |
| Elongation at break (%) (after stability test) | 118.56 ± 10 | 24.8 ± 5 |
| Water uptake (%) | 5 ± 2 | 10.9 ± 2 |
| Swelling ratio (%) | negligible | 3.4 ± 0.9 |
| Acid uptake (%) | 5 ± 3.4 | 9 ± 2.7 |

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein.

In some embodiments, the terms "a" and "an" and "the" and similar references used in the context of describing a particular embodiment (especially in the context of certain of the following claims) are construed to cover both the singular and the plural, unless specifically noted otherwise. In some embodiments, the term "or" as used herein, including the claims, is used to mean "and/or" unless explicitly indicated to refer to alternatives only or to refer to the alternatives that are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and may also cover other unlisted steps. Similarly, any composition or device that "comprises," "has" or "includes" one or more features is not limited to possessing only those one or more features and may cover other unlisted features.

All methods described herein are performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member is referred to and claimed individually or in any combination with other members of the group or other elements found herein. One or more members of a group are included in, or deleted from, a group for reasons of convenience or patentability. When any such inclusion or deletion occurs, the specification is herein deemed to contain the group as modified thus fulfilling the written description of all Markush groups used in the appended claims.

To facilitate the understanding of the embodiments described herein, a number of terms are defined below. The terms defined herein have meanings as commonly understood by a person of ordinary skill in the areas relevant to the present disclosure. Terms such as "a," "an," and "the" are not intended to refer to only a singular entity, but rather include the general class of which a specific example may be used for illustration. The terminology herein is used to describe specific embodiments of the disclosure, but their usage does not delimit the disclosure, except as outlined in the claims.

All of the compositions and/or methods disclosed and claimed herein may be made and/or executed without undue experimentation in light of the present disclosure. While the compositions and methods of this disclosure have been described in terms of the embodiments included herein, it will be apparent to those of ordinary skill in the art that variations may be applied to the compositions and/or methods and in the steps or in the sequence of steps of the method described herein without departing from the concept, spirit, and scope of the disclosure. All such similar substitutes and modifications apparent to those skilled in the art are deemed to be within the spirit, scope, and concept of the disclosure as defined by the appended claims.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An anion exchange membrane (AEM) comprising:
    a chloromethylated polystyrene-block-poly(ethylene-ran-butylene)-block-polystyrene (SEBS) triblock copolymer functionalized with Tris(2,4,6-trimethoxyphenyl) phosphine (TRIS) cations; and
    wherein the triblock copolymer is fully functionalized with the Tris(2,4,6-trimethoxyphenyl) phosphine (TRIS) cations.

2. The AEM of claim 1, wherein the AEM is a composite AEM and further comprises one or more metal oxide fillers.

3. The AEM of claim 2, wherein the one or more metal oxide fillers is selected from the group consisting of $TiO_2$, $SiO_2$, $Al_2O_3$, $SnO_2$, $WO_2$, $SbO_2$, and $NbO_2$.

4. The AEM of claim 1, wherein the AEM is a reinforced AEM and further comprises a reinforcement material base.

5. The AEM of claim 4, wherein the reinforcement material base is selected from the group consisting of polyethylene (PE), polytetrafluoroethylene (PTFE), and extended polytetrafluoroethylene (ePTFE).

6. The AEM of claim 1, wherein the AEM is a reinforced composite AEM and further comprises:
one or more metal oxide fillers; and
a reinforcement material base.

7. The reinforced composite AEM of the claim 6, wherein the one or more metal oxide fillers is selected from the group consisting of $TiO_2$, $SiO_2$, $Al_2O_3$, $SnO_2$, $WO_2$, $SbO_2$, and $NbO_2$.

8. The reinforced composite AEM of claim 6, wherein the reinforcement material base is selected from the group consisting of polyethylene (PE), polytetrafluoroethylene (PTFE), and extended polytetrafluoroethylene (ePTFE).

9. A method for preparing the anion exchange membrane (AEM) of claim 1, the method comprising:
chloromethylating a polymer backbone, wherein the polymer backbone is polystyrene-block-poly (ethylene-ran-butylene)-block-polystyrene (SEBS) triblock copolymer; and
fully functionalizing the chloromethylated polymer backbone with Tris(2,4,6-trimethoxyphenyl) phosphine (TRIS) cations.

10. The method of claim 9, wherein the AEM is a composite AEM, and wherein the method further comprises incorporating at least one metal oxide filler into the cation-functionalized chloromethylated polymer backbone.

11. The method of claim 10, wherein the at least one metal oxide filler is selected from the group consisting of $TiO_2$, $SiO_2$, $Al_2O_3$, $SnO_2$, $WO_2$, $SbO_2$, and $NbO_2$.

12. A method of claim 9, wherein the AEM is a reinforced AEM, and wherein the method comprises reinforcing the cation-functionalized, chloromethylated polymer backbone with a reinforcement material base.

13. The method of claim 12, wherein the reinforcement material base is selected from the group consisting of polyethylene (PE), polytetrafluoroethylene (PTFE), and extended polytetrafluoroethylene (ePTFE).

14. The method of claim 10, wherein the composite AEM is a reinforced composite AEM, and wherein the method further comprises reinforcing the filler-incorporated, cation-functionalized, chloromethylated polymer backbone with a reinforcement material base.

15. The method of claim 14, wherein the at least one metal oxide filler is selected from the group consisting of $TiO_2$, $SiO_2$, $Al_2O_3$, $SnO_2$, $WO_2$, $SbO_2$, and $NbO_2$, and wherein the reinforcement material base is selected from the group consisting of polyethylene (PE), polytetrafluoroethylene (PTFE), and extended polytetrafluoroethylene (ePTFE).

* * * * *